US012443340B2

(12) United States Patent
Han et al.

(10) Patent No.: US 12,443,340 B2
(45) Date of Patent: Oct. 14, 2025

(54) ELECTRONIC DEVICE MOUNTED TO VEHICLE AND OPERATION METHOD THEREOF

(71) Applicant: Samsung Electronics Co., Ltd., Suwon-si (KR)

(72) Inventors: Sanghyun Han, Suwon-si (KR); Hyewon Kim, Suwon-si (KR); Seungwoo Shin, Suwon-si (KR); Youngsik Lee, Suwon-si (KR); Daesoo Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/758,413

(22) Filed: Jun. 28, 2024

(65) Prior Publication Data

US 2024/0353996 A1    Oct. 24, 2024

Related U.S. Application Data

(63) Continuation of application No. PCT/KR2022/021518, filed on Dec. 28, 2022.

(30) Foreign Application Priority Data

Dec. 31, 2021   (KR) .................. 10-2021-0194553
Jan. 12, 2022   (KR) .................. 10-2022-0004735

(51) Int. Cl.
*G06F 3/04883*    (2022.01)
*B60K 35/10*    (2024.01)
*B60K 35/22*    (2024.01)

(52) U.S. Cl.
CPC .......... *G06F 3/04883* (2013.01); *B60K 35/10* (2024.01); *B60K 35/22* (2024.01);
(Continued)

(58) Field of Classification Search
CPC .................................................. G06F 3/04883
See application file for complete search history.

(56) References Cited

U.S. PATENT DOCUMENTS 7,705,830 B2   4/2010   Westerman et al.
8,368,653 B2   2/2013   Han et al.
(Continued)

FOREIGN PATENT DOCUMENTS

EP     3882755 A1      9/2021
JP     2013-206377 A  10/2013
(Continued)

OTHER PUBLICATIONS

International Search Report with Written Opinion dated Mar. 30, 2023; International Appln. No. PCT/KR2022/021518.
(Continued)

*Primary Examiner* — Nan-Ying Yang
(74) *Attorney, Agent, or Firm* — Jefferson IP Law, LLP

(57) ABSTRACT

An electronic device mounted in a vehicle, and an method performed thereby are provided. The electronic device may include a touch screen, memory storing at least one instruction, and at least one processor communicatively coupled to the touch screen and the memory. The at least one instruction, when executed by the at least one processor individually or collectively, may cause the electronic device to recognize an input event, based on receiving a multi-touch input or a hover input, of a user with respect to the touch screen, may identify a function corresponding to the input event, based on shape information of a plurality of points and position information of the plurality of points at which the input event is recognized, may change a function value with respect to the identified function, based on a gesture input being recognized via the touch screen, and may display a user interface (UI) indicating the changed function value.

18 Claims, 15 Drawing Sheets

(52) U.S. Cl.
CPC .............. *G06F 2203/04101* (2013.01); *G06F 2203/04104* (2013.01)

(56) References Cited

U.S. PATENT DOCUMENTS

| | | | |
|---|---|---|---|
| 8,910,086 | B2 | 12/2014 | Bendewald et al. |
| 9,218,121 | B2 | 12/2015 | Chang et al. |
| 10,082,902 | B1* | 9/2018 | Barber ................ G06F 3/04845 |
| 10,346,033 | B2 | 7/2019 | Shin et al. |
| 11,314,346 | B2 | 4/2022 | Cho et al. |
| 2010/0257447 | A1 | 10/2010 | Kim et al. |
| 2011/0248939 | A1 | 10/2011 | Woo et al. |
| 2012/0068950 | A1* | 3/2012 | Conde ................ G06F 3/04883 |
| | | | 345/173 |
| 2014/0149947 | A1 | 5/2014 | Blyumen |
| 2015/0161836 | A1* | 6/2015 | Park ....................... G06F 21/36 |
| | | | 340/5.51 |
| 2015/0227221 | A1* | 8/2015 | Tsunoda ................ G06F 1/1698 |
| | | | 345/173 |
| 2015/0234536 | A1 | 8/2015 | Yamashita et al. |
| 2015/0291032 | A1* | 10/2015 | Kim ........................... B62D 1/04 |
| | | | 280/779 |
| 2016/0224145 | A1 | 8/2016 | Harrison et al. |
| 2017/0048576 | A1 | 2/2017 | Kim et al. |
| 2019/0212912 | A1 | 7/2019 | Abt et al. |
| 2021/0072892 | A1 | 3/2021 | Lee et al. |
| 2021/0349592 | A1 | 11/2021 | Lemcke et al. |
| 2024/0045543 | A1 | 2/2024 | Pantfoerder |

FOREIGN PATENT DOCUMENTS

| | | | |
|---|---|---|---|
| JP | 2019-145094 | A | 8/2019 |
| KR | 10-2009-0108063 | A | 10/2009 |
| KR | 10-2009-0108116 | A | 10/2010 |
| KR | 10-2010-0110568 | A | 10/2010 |
| KR | 10-2011-0112980 | A | 10/2011 |
| KR | 10-2013-0081183 | A | 7/2013 |
| KR | 10-2013-0105170 | A | 9/2013 |
| KR | 10-2016-0022651 | A | 3/2016 |
| KR | 10-2017-0069773 | A | 6/2017 |
| KR | 10-1748452 | B1 | 6/2017 |
| KR | 10-1818748 | B1 | 1/2018 |
| KR | 10-2018-0127042 | A | 11/2018 |
| KR | 10-2018-0127049 | A | 11/2018 |
| KR | 10-2019-0111095 | A | 10/2019 |
| KR | 10-2021-0029921 | A | 3/2021 |
| WO | 2007/133483 | A1 | 11/2007 |

OTHER PUBLICATIONS

Extended European Search Report dated Feb. 27, 2025, issued in a European Application No. 22916754.9.

\* cited by examiner

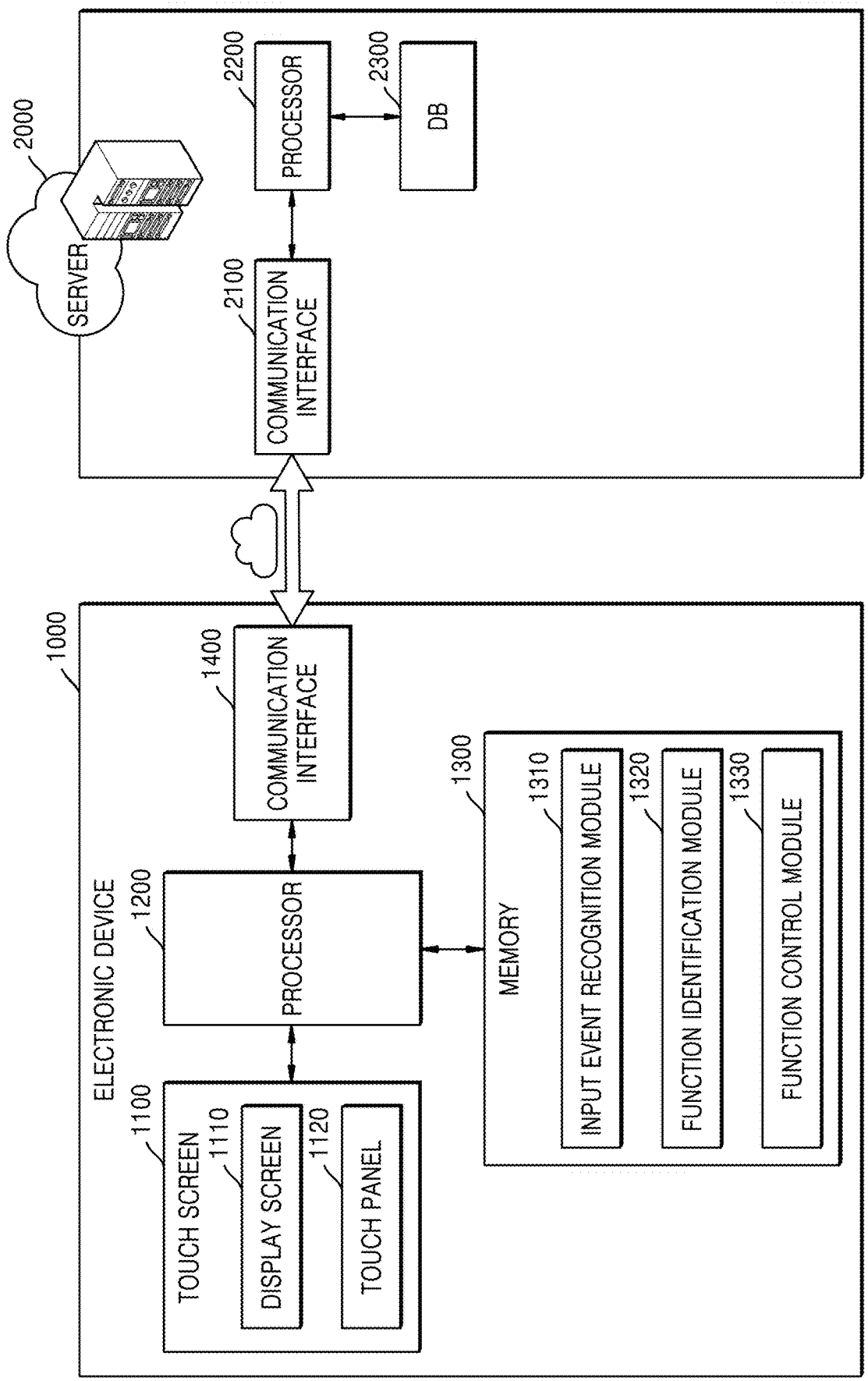

ELECTRONIC DEVICE MOUNTED TO VEHICLE AND OPERATION METHOD THEREOF

CROSS-REFERENCE TO RELATED APPLICATION(S)

This application is a continuation application, claiming priority under § 365 (c), of an International application No. PCT/KR2022/021518, filed on Dec. 28, 2022, which is based on and claims the benefit of a Korean patent application number 10-2021-0194553, filed on Dec. 31, 2021, in the Korean Intellectual Property Office, and of a Korean patent application number 10-2022-0004735, filed on Jan. 12, 2022, in the Korean Intellectual Property Office, the disclosure of each of which is incorporated by reference herein in its entirety.

BACKGROUND

1. Field

The disclosure relates to an electronic device mounted in a vehicle and a method performed thereby. More particularly, the disclosure relates to an electronic device for performing a related function based on receiving a multi-touch input or a hover input at a particular position on a user's touch screen, and a method performed thereby.

2. Description of Related Art

Recently, vehicles are not limited to only being a means of transportation, but also include an infotainment system that provides various information to passengers and outputs multimedia content. The 'infotainment system' refers to a system in which information and entertainment are integrated, wherein the information indicates necessary information such as driving of a vehicle and showing the way via navigation, and the entertainment provides various amusements, multimedia content reproduction, an artificial intelligent (AI) assistant service, or the like. The infotainment system includes a touch screen capable of receiving a user touch input, and such touch screens are becoming increasingly larger.

In order to perform a particular function via a touch input to a touch screen in a general infotainment system, a user experiences inconvenience while performing a touch input multiple times according to a hierarchical menu. For example, in order to adjust a set temperature of an air conditioner of a vehicle via an infotainment system with a touch screen, a user has to perform two touches including a first touch input for selecting the air conditioner and a second touch input for adjusting the set temperature of the air conditioner. In order to select the air conditioner, the user has to correctly touch an area in which an air conditioner user interface (UI) is displayed, and afterward, in order to adjust the set temperature, the user checks again an area in which a temperature UI is displayed, and then, has to correctly touch a display area of the temperature UI, and thus, user convenience is poor.

Also, when the general infotainment system receives a touch input of the user for performing the particular function, a UI for another function is inactivated to prevent the other function being selected, except for the function selected by the user, and thus, the user may experience inconvenience.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device for performing a related function based on receiving a multi-touch input or a hover input at a particular position on a user's touch screen, and a method performed thereby.

Additional aspects will be set forth in part in the description which follows and, in part, will be apparent from the description, or may be learned by practice of the presented embodiments.

In accordance with an aspect of the disclosure, an electronic device mounted in a vehicle is provided. The electronic device may include a touch screen, memory storing at least one instruction, and at least one processor communicatively coupled to the touch screen and the memory. The at least one instruction, when executed by the at least one processor individually or collectively, may cause the electronic device to recognize an input event, based on receiving multi-touch input or a hover input of a user with respect to the touch screen. The at least one processor may be configured to identify a function corresponding to the input event, based on shape information of a plurality of points and position information of the plurality of points at which the input event is recognized on the touch screen. The at least one processor may be configured to change a function value with respect to the identified function, based on a gesture input being recognized via the touch screen. The at least one processor may be configured to display, on the touch screen, a user interface (UI) indicating the changed function value.

In accordance with another aspect of the disclosure, a method performed by an electronic device mounted in a vehicle is provided. The method may include recognizing an input event, based on receiving multi-touch input or a hover input, of a user with respect to a touch screen. The method may include identifying a function corresponding to the input event, based on shape information of a plurality of points and position information of the plurality of points at which the input event is recognized on the touch screen. The method may include changing a function value with respect to the identified function, based on a gesture input being recognized via the touch screen. The method may include displaying a UI indicating the changed function value.

In accordance with another aspect of the disclosure, one or more non-transitory computer-readable storage media storing at least one instruction that, when executed by at least one processor of an electronic device individually or collectively, causes the electronic device to perform operations is provided. The operations include recognizing an input event, based on receiving multi-touch input or a hover input, of a user with respect to a touch screen, identifying a function corresponding to the input event, based on shape information of a plurality of points and position information of the plurality of points at which the input event is recognized on the touch screen, changing a function value with respect to the identified function, based on a gesture input being recognized via the touch screen, and displaying a UI indicating the changed function value.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 13 is a diagram for describing FIG. 12 in detail according to an embodiment of the disclosure.

Throughout the drawings, it should be noted that like reference numbers are used to depict the same or similar elements, features, and structures.

DETAILED DESCRIPTION

Figure 1:
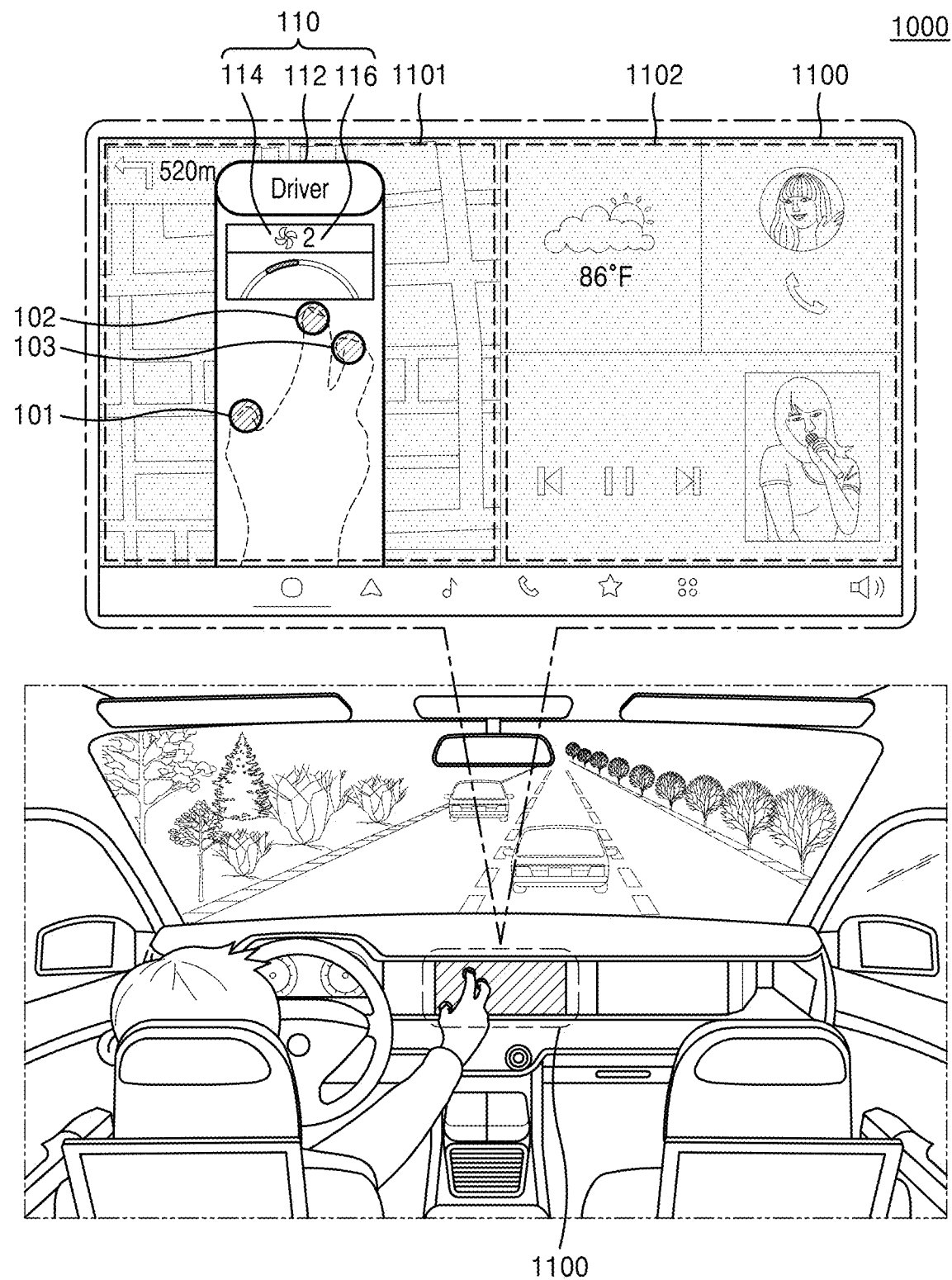
FIG. 1 is a conceptual diagram illustrating an operation in which an electronic device of the disclosure recognizes an input event and performs a function to the recognized input event according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, designations of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, when a part "includes" or "comprises" an element, it means that the part may additionally include or comprise other elements rather than excluding other elements as long as there is no particular opposing recitation. In addition, as used in the specification, terms such as " . . . er (or)", " . . . unit", " . . . module", etc., indicate a unit that performs at least one function or operation, which may be implemented as hardware or software or a combination thereof.

As used in the disclosure, the expression "configured to" may be interchangeably used with, for example, "suitable for", "having the capacity to", "designed to", "adapted to", "made to", or "capable of", according to a situation. The expression "configured to" may not imply only "specially designed to" in a hardware manner. Instead, in a certain circumstance, the expression "a system configured to" may indicate the system "capable of" together with another device or components. For example, "a processor configured (or set) to perform A, B, and C" may imply a dedicated processor (e.g., an embedded processor) for performing a corresponding operation or a generic-purpose processor (e.g., central processing unit (CPU) or an application processor) capable of performing corresponding operations by executing one or more software programs stored in memory.

Also, in the disclosure, it should be understood that when elements are "connected" or "coupled" to each other, the elements may be directly connected or coupled to each other, but may alternatively be connected or coupled to each other with an element therebetween, unless specified otherwise.

Hereinafter, an embodiment of the disclosure will be described in detail with reference to the accompanying drawings to allow one of skill in the art to easily implement the embodiment. The disclosure may, however, be embodied in many different forms and should not be construed as being limited to an embodiment set forth herein.

Hereinafter, embodiments of the disclosure will be described in detail with reference to the drawings.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

FIG. 1 is a conceptual diagram illustrating an operation in which the electronic device 1000 of the disclosure recognizes an input event and performs a function to the recognized input event according to an embodiment of the disclosure.

Referring to FIG. 1, the electronic device 1000 may be provided in a vehicle and may include a touch screen 1100. According to an embodiment of the disclosure, the touch screen 1100 may be a center information display (CID) in the vehicle, but the disclosure is not limited thereto. For example, the touch screen 1100 may be configured as a navigation device or an infotainment system. The electronic device 1000 may further include at least one of an instrument panel display, a head up display (HUD), or a passenger set display as well as the touch screen 1100.

The electronic device 1000 may receive a touch input from a user via the touch screen 1100. In an embodiment of the disclosure, the touch screen 1100 may receive not only a single touch input of touching one touch point but also receive a multi-touch input of touching two or more touch points. In another embodiment of the disclosure, the touch screen 1100 may receive not only a touch input but also receive a hover input that is an input at a position remote from the touch screen 1100 by a preset distance.

The electronic device 1000 may recognize the multi-touch input of the user received via the touch screen 1100, and may identify a function corresponding to the multi-touch input, based on information about positions and shapes of a plurality of points 101, 102, and 103 at which the multi-touch input is recognized. The shapes of the plurality of points 101, 102, and 103 may include information about the number of the plurality of points 101, 102, and 103 and a distance between each of the plurality of points 101, 102, and 103. A function that corresponds to the positions and shapes of the plurality of points 101, 102, and 103 according to the multi-touch input may be preset. According to an embodiment of the disclosure, one or more functions provided by the electronic device 1000 may be mapped and stored in memory (see 1300 of FIG. 2) or a database, according to combinations of the positions and shapes of the plurality of points 101, 102, and 103.

In the embodiment shown in FIG. 1, a display screen area of the touch screen 1100 is divided into a first area 1101 and a second area 1102, and as the multi-touch input of the user is input on the first area 1101, the plurality of points 101, 102, and 103 may be recognized in the first area. Also, the first point 101 and the second point 102 from among the plurality of points 101, 102, and 103 may be recognized at a close range, and the third point 103 may be recognized at a position separated from the first point 101 and the second point 102 by a certain distance. In this case, the electronic device 1000 may obtain information about positions and shapes of the plurality of points 101, 102, and 103 recognized in the first area 1101 within the touch screen 1100, and may identify a 'driver seat air conditioner strength adjustment function' that is a function corresponding to the multi-touch input, based on the information about the positions and shapes of the plurality of points 101, 102, and 103.

The electronic device 1000 may display a user interface (UI) 110 indicating the identified function. The function information UI 110 may be a graphical user interface (GUI) that represents information about a function corresponding to a multi-touch input, in the form of text, a number, a figure, an icon, or an image. According to an embodiment of the disclosure, the function information UI 110 may include text 112 indicating function information, an icon 114, and a function value UI 116 indicating a function value. Here, the 'function value' means a numerical value indicating a state that is changed or adjusted by a function. In the embodiment shown in FIG. 1, the function information UI 110 may include 'Driver' that is the text 112 indicating a driver seat, the icon 114 in a pinwheel form indicating an air conditioner strength, and the function value UI 116 indicating a value (e.g., '2') of the air conditioner strength.

The electronic device 1000 may receive a gesture input of the user. According to an embodiment of the disclosure, the user may input a gesture of moving up and down or performing rotation movement in left and right direction while the user touches the touch screen 1100 with three fingers, and the electronic device 1000 may recognize the gesture input of the user.

As the gesture input is recognized, the electronic device 1000 may change a function value of the identified function. For example, a function value of a function for 'driver seat air conditioner strength adjustment' may be a numerical value indicating strength of an air conditioner that currently operates. In the embodiment shown in FIG. 1, the function value may be 2. As another example, a function value of a function for 'air conditioner temperature adjustment' may be a numerical value (e.g., 25° C.) indicating a temperature by the air conditioner in the vehicle. The electronic device 1000 may change the function value, according to the gesture input of the user that moves the positions of the plurality of points 101, 102, and 103 on the touch screen 1100. According to an embodiment of the disclosure, the electronic device 1000 may adjust a size and a change level of the function value, according to a movement direction and a movement distance of the gesture input of the user. For example, when the gesture input of rotating the plurality of points 101, 102, and 103 in a clockwise direction by a certain distance is recognized, the electronic device 1000 may increase the strength of the air conditioner from 2 to 3. As another example, when the gesture input of rotating the plurality of points 101, 102, and 103 in a counterclockwise direction by a certain distance is recognized, the electronic device 1000 may decrease the strength of the air conditioner from 2 to 1.

The electronic device 1000 may display the changed function value via the function value UI 116. The electronic device 1000 may change in real time a value of the function value UI 116, according to the gesture input. In the embodiment shown in FIG. 1, the electronic device 1000 may change and display a numerical value of the function value UI 116 from 2 to 3 (or 4, 5), according to a rotation level of the gesture input.

When a user attempts to perform a particular function via a touch input to the touch screen 1100 in a general infotainment system, the user experiences inconvenience while performing a touch input multiple times according to a hierarchical menu. For example, in order to adjust strength of the air conditioner of a driver seat of the vehicle via the touch screen 1100, the user has to perform three touches including a first touch input of selecting the air conditioner, a second touch input of selecting wind strength of the air conditioner, and a third touch input (or a gesture input) of increasing or decreasing the wind strength of the air conditioner. The user has to correctly touch an area of the touch screen 1100 on which an air conditioner UI is displayed so as to select the air conditioner, check again the area on which a strength UI is displayed so as to adjust the wind strength, and correctly touch a display area of the wind strength UI, so that user convenience is low, and usability is degraded. Also, when the user is a driver of the vehicle, the user has to see a position at which the air conditioner UI is displayed on the touch screen 1100 so as to check the touch area, and seeing a particular position on the touch screen 1100 while driving causes a decrease in concentration. When the driver gazes at the particular position on the touch screen 1100, traffic accident may occur due to the decrease in concentration.

The disclosure aims to provide the electronic device 1000 and a method performed thereby, the electronic device 1000 enables the user to perform a particular function of the vehicle without touching a correct position on the touch screen 1100 in the vehicle or performing a touch multiple times to move in a hierarchical menu, so that manipulability and user convenience are improved.

The electronic device 1000 according to an embodiment of the disclosure may identify a function corresponding to the plurality of points 101, 102, and 103, based on information about positions and shapes of the plurality of points 101, 102, and 103 at which a multi-touch input or hover inputs are recognized, regardless of an area of the touch screen 1100 on which a particular UI is displayed, and may perform the identified function. The electronic device 1000 according to an embodiment of the disclosure allows the user to conveniently execute a user-desired function even when the user does not touch a correct area or does not perform a plurality of touch inputs according to a hierarchical menu items, so that a technical effect of improving manipulability and user convenience is provided. Also, the electronic device 1000 according to an embodiment of the disclosure allows the user to execute a desired function without interrupting driving when the user is a driver, so that occurrence of accident due to a decrease in concentration of the user may be prevented, and safety of the driver and a passenger may be improved.

Figure 2:
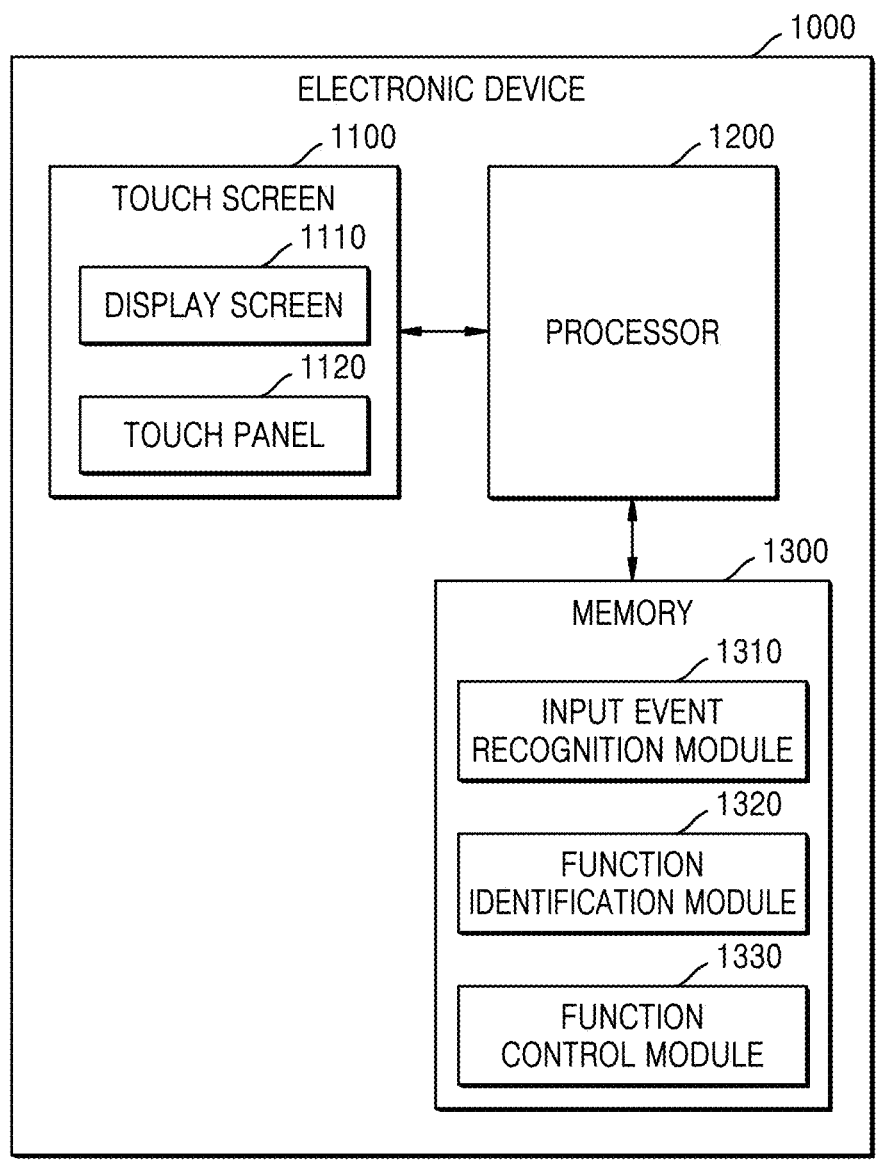
FIG. 2 is a block diagram illustrating elements of an electronic device according to an embodiment of the disclosure.

FIG. 2 is a block diagram illustrating elements of the electronic device 1000 according to an embodiment of the disclosure.

The electronic device 1000 may be mounted in the vehicle or may be installed at an external structure of the vehicle. In an embodiment, the electronic device 1000 may include one or more electronic circuits configuring an electronic control unit (ECU) in the vehicle. However, the disclosure is not limited thereto.

Referring to FIG. 2, the electronic device 1000 may include the touch screen 1100, a processor 1200, and the memory 1300. The touch screen 1100, the processor 1200, and the memory 1300 may be electrically and/or physically connected to each other.

However, elements shown in FIG. 2 are merely an embodiment of the disclosure, and elements included in the electronic device 1000 are not limited to those shown in FIG. 2. The electronic device 1000 may not include some of the elements shown in FIG. 2, and may further include elements not shown in FIG. 2. For example, the electronic device 1000 may further include a communication module configured to perform data communication with a server or other external device. According to an embodiment of the disclosure, the electronic device 1000 may further include one or more display units as well as the touch screen 1100. The plurality of display units may further include at least one of an instrument panel display, a HUD, a passenger seat display, or a rear seat display.

The touch screen 1100 may be a CID, but the disclosure is not limited thereto. For example, the touch screen 1100 may be configured as a navigation device or an infotainment system. The touch screen 1100 may include a display screen 1110 and a touch panel 1120. According to an embodiment of the disclosure, the display screen 1110 and the touch panel 1120 may be integrated into one element.

The display screen 1110 may display at least one of an execution screen of an application, vehicle information, and function information UI, and a function value UI. The display screen 1110 may include at least one of a liquid crystal display, a thin film transistor-liquid crystal display, a light-emitting diode display, an organic light-emitting diode display, a flexible display, a three-dimensional (3D) display, or an electrophoretic display. However, but the disclosure is not limited thereto.

The touch panel 1120 is configured to receive a touch input of a user, and generate a touch signal corresponding to a touch point at which the touch input is received. The touch panel 1120 is a transparent panel through which an image displayed by the display screen 1110 placed at the rear is transmitted, so that the user may visually identify the image. The touch panel 1120 may be classified into a resistive type, a capacitive type, an electro-magnetic type, a surface acoustic wave (SAW) type, an infrared type, or the like.

According to an embodiment of the disclosure, the touch panel 1120 may receive a multi-touch input of touching two or more positions or areas. When the multi-touch input is received, the touch panel 1120 may recognize a plurality of points at which the multi-touch input is received, and may obtain position information of the recognized plurality of points. The touch panel 1120 may provide the obtained position information of the plurality of points to the processor 1200.

The touch panel 1120 may receive a gesture input of the user. The 'gesture input' indicates a motion input by which the user touches the touch screen 1100 with a plurality of fingers and performs scrolling in up and down directions, swiping in left and right directions, or rotating in a clockwise direction or a counterclockwise direction. The gesture input may further include, for example, a pinch in or pinch out input. According to an embodiment of the disclosure, the touch panel 1120 may obtain information about the number and positions of a plurality of points, and may recognize the gesture input of the user, based on information about the number and positions of the plurality of points that are moved over time or changed as a touch is released.

As long as at least one point from among the plurality of points at which the gesture input is recognized is maintained while being touched on the touch screen 1100, the touch panel 1120 may recognize the gesture input as the same gesture. When the plurality of points are all separated from the touch screen 1100 by a certain distance or more, the touch panel 1120 may recognize that the gesture input is ended. When a touch and a gesture input are received after a touch state is released as the plurality of points are all separated from the touch screen 1100, the touch panel 1120 may recognize the gesture input as a new gesture input different from the previous gesture input.

Although not illustrated in drawing, the touch screen 1100 may further include a hover sensor configured to receive a hover input. The hover sensor may receive the hover input by a finger or an input device (e.g., a stylus pen, an S-pen, etc.) remote from the touch screen 1100 by a preset distance. According to an embodiment of the disclosure, the hover sensor may include a driver control system configured to generate and form an electric field on the touch panel 1120, may recognize a change in capacitance via a sensor array trace line when the finger or the input device passes through the electric field, and may recognize the hover input, based on the recognized change in the capacitance.

The processor 1200 may execute one or more instructions of a program stored in the memory 1300. The processor 1200 may include hardware elements for performing arithmetic, logic, and input/output computations and signal processing. The processor 1200 may include, for example, at least one of a CPU, a microprocessor, a graphic processor unit (GPU), application specific integrated circuits (ASICs), digital signal processors (DSPs), digital signal processing devices (DSPDs), programmable logic devices (PLDs), and field programmable gate arrays (FPGAs), but the disclosure is not limited thereto.

FIG. 2 illustrates the processor 1200 as one element, but the disclosure is not limited thereto. In an embodiment, the processor 1200 may include one or more processors.

According to an embodiment of the disclosure, the processor 1200 may include an artificial intelligence (AI) processor that performs AI learning. In this case, the AI processor may perform inferring using an AI model. The AI processor may be manufactured in the form of a dedicated hardware chip (e.g., a neural processing unit (NPU)) for AI, or may be manufactured as part of an existing general-purpose processor (e.g., a CPU or an application processor) or a dedicated graphics processor (e.g., a graphics processing unit (GPU)). In another embodiment of the disclosure, the AI processor may be embedded in an externa server.

The memory 1300 may be configured as a storage medium of at least one type of a flash memory type, a hard disk type, a multimedia card micro type, a card type memory (for example, a secure digital (SD) or an extreme digital (XD) memory), a random access memory (RAM), a static RAM (SRAM), a read-only memory (ROM), an electrically erasable programmable ROM (EEPROM), a programmable ROM (PROM), or an optical disk.

The memory 1300 may store at least one of instructions, an algorithm, a data structure, program code, and an application program, which is readable by the processor 1200. The instructions, the algorithm, the data structure, and the program code stored in the memory 1300 may be implemented in, for example, programming or scripting languages such as C, C++, Java, assembler, etc.

The memory 1300 may include an input event recognition module 1310, a function identification module 1320, and a function control module 1330. The input event recognition module 1310, the function identification module 1320, and the function control module 1330 included in the memory 1300 indicate a unit of processing a function or an operation performed by the processor 1200, and may be implemented as software such as instructions or program code.

In embodiments below, the processor 1200 may be implemented by executing instructions or programs codes of a program stored in the memory 1300.

The input event recognition module 1310 is a module configured to recognize an input event, based on the multi-touch input or the hover input being received via the touch screen 1100. According to an embodiment of the disclosure, the input event recognition module 1310 may be implemented in at least one application executed by the processor 1200, and may recognize the input event via the multi-touch input or the hover input through the executed application. The input event recognition module 1310 may provide, to the function identification module 1320, recognition information of the input event recognized via the application. However, the disclosure is not limited thereto, and in another embodiment of the disclosure, the input event recognition module 1310 may be implemented as a software module integrated into an operating system (e.g., Android, Windows, etc.), and may recognize an input event via a multi-touch input or a hover input, according to the operating system, without an application. The processor 1200 may execute instructions or program code related to the input event recognition module 1310 to recognize the input event according to the multi-touch input or the hover input received via the touch screen 1100.

The function identification module 1320 is a module configured to identify a function corresponding to the input event, based on the recognition information of the input event. The function identification module 1320 may be configured to identify a function corresponding to the input event, based on shape information and position information of a plurality of points at which the input event is recognized. The processor 1200 may execute instructions or program code related to the function identification module 1320 to identify the function corresponding to the input event.

According to an embodiment of the disclosure, the processor 1200 may obtain shape information of a plurality of points including information about the number of the plurality of points and a distance between each of the plurality of points at which the input event is recognized, and may determine a type of the input event by analyzing the shape information of the plurality of points. The processor 1200 may identify a function set to corresponding to the type of the input event. For example, when the number of the plurality of points at which the input event is recognized is 3, and a distance between each of the plurality of points is equal to or less than a preset threshold, the processor 1200 may identify that the type of the input event is an up-down scroll input, and the function corresponding to the input event is a function of temperature adjustment for a vehicle air conditioner. As another example, when the number of the plurality of points at which the input event is recognized is 3, a distance between each of the plurality of points is greater than the preset threshold, and an arrangement relation from among the plurality of points is a circle shape, the processor 1200 may identify that the type of the input event is a rotation input, and the function corresponding to the input event is a function of strength adjustment for a vehicle air conditioner fan. A particular embodiment in which the processor 1200 identifies a function corresponding to an input event, based on shape information of a plurality of points at which the input event is recognized will be described in detail with reference to FIGS. 4A and 4B.

According to an embodiment of the disclosure, the processor 1200 may identify a function corresponding to an input event, based on position information of an area in which the input event is recognized, from among a plurality of areas into which the touch screen 1100 is divided. For example, in a case where the touch screen 1100 is divided into two areas including a first area and a second area, the first area is positioned adjacent to a driver seat, and the second area is positioned adjacent to a passenger seat, when an input event is recognized in the first area, the processor 1200 may identify that a function corresponding to the input event is temperature adjustment for a driver seat air conditioner or a fan speed adjustment function for the driver seat air conditioner. Here, the processor 1200 may identify one function from among the temperature adjustment function for the driver seat air conditioner and the fan speed adjustment function for the driver seat air conditioner, based on shape information of a plurality of points according to the input event recognized in the first area. As another example, when the input event is recognized in the second area of the touch screen 1100, the processor 1200 may identify that a function corresponding to the input event is temperature adjustment for a passenger seat air conditioner or a fan speed adjustment function for the passenger seat air conditioner. A particular embodiment in which the processor 1200 identifies a function corresponding to an input event, based on information of a position at which the input event is recognized, from among a plurality of areas of the touch screen 1100, will be described in detail with reference to FIGS. 5A and 5B.

According to an embodiment of the disclosure, the electronic device 1000 may include the touch screen 1100 provided in plural. The processor 1200 may identify a function corresponding to an input event, based on information of a position of the touch screen 1100 at which the input event is recognized, from among the plurality of touch screens 1100. For example, from among the plurality of touch screens 1100, a first touch screen may be arranged adjacent to a driver seat and a second touch screen may be arranged adjacent to a passenger seat. In an embodiment, when an input event is recognized via the first touch screen, the processor 1200 may identify that a function corresponding to the input event is temperature adjustment for a driver seat air conditioner or a fan speed adjustment function for the driver seat air conditioner. Here, the processor 1200 may identify one function from among the temperature adjustment function for the driver seat air conditioner and the fan speed adjustment function for the driver seat air conditioner, based on shape information of a plurality of points according to the input event recognized via the first touch screen. In another embodiment, when an input event is recognized via the second touch screen, the processor 1200 may identify that a function corresponding to the input event is temperature adjustment for a passenger seat air conditioner or a fan speed adjustment function for the passenger seat air conditioner. A particular embodiment in which the processor 1200 identifies a function corresponding to an input event, based on information of a position of the touch screen 1100 at which the input event is recognized, from among the plurality of touch screens 1100, will be described in detail with reference to FIGS. 6 and 7.

According to an embodiment of the disclosure, at least one function executed by the electronic device 1000 or a vehicle may be mapped to correspond to each of combinations of positions and shapes of a plurality of points at which an input event is recognized on the touch screen 1100. A mapping relation between the at least one function and the combinations of positions and shapes of the plurality of points may be stored in the form of a look-up table (LUT) in the memory 1300.

However, the disclosure is not limited thereto, and the mapping relation between the at least one function and positions and shapes of an input event may be determined by a user input. In this case, the at least one function may be mapped to at least one of a position of the touch screen 1100 in which the input event is recognized by the user input, an area in the touch screen 1100 in which the input event is recognized, and a shape of the input event.

According to an embodiment of the disclosure, the processor 1200 may obtain operation state information of the electronic device 1000, and may identify a function corresponding to an input event, based on shapes and positions of a plurality of points at which the input event is recognized, and the operation state information. The 'operation state information' may include information about at least one of a function, an operation, or an application, which are performed/executed by the electronic device 1000. According to an embodiment of the disclosure, the processor 1200 may identify a predetermined function corresponding to an input event, from among at least one function provided by the executed application. For example, in a case where the executed application is a music application, when an input event is recognized according to a multi-touch input or a hover input received via the touch screen 1100, the processor 1200 may identify at least one function from among 'next song', 'previous song', or 'music volume control', as a function corresponding to the input event. A particular embodiment in which the processor 1200 identifies a function corresponding to an input event, based on operation state information, will be described in detail with reference to FIG. 8.

The processor 1200 may control operations of elements of the electronic device 1000 or a vehicle to perform an operation according to an identified function.

According to an embodiment of the disclosure, the processor 1200 may display, on the touch screen 1100, a function information UI graphically showing information about a function. The function information UI may be a GUI that represents information about a function identified by the processor 1200, in the form of text, a number, a figure, an icon, or an image.

When a gesture input is recognized by the input event recognition module 1310, the function control module 1330 is configured to change a function value about a function. The touch screen 1100 may receive a gesture input, and the input event recognition module 1310 may recognize the gesture input and may provide information about a result of recognizing the gesture input to the function control module 1330. The processor 1200 may execute instructions or program code related to the function control module 1330 to change a function value according to the gesture input. Here, the 'function value' means a numerical value indicating a state changed or adjusted by the function. For example, a function value of a function for 'driver seat air conditioner strength adjustment' may be a numerical value indicating strength of an air conditioner that currently operates, or may be a temperature indicating a set temperature of the air conditioner.

The processor 1200 may change a function value, based on a change in a position of each of a plurality of points changed by a gesture input. According to an embodiment of the disclosure, the processor 1200 may calculate an average value of positional variations of the plurality of points, and may adjust a function value according to the calculated average value.

The processor 1200 may display, on the touch screen 1100, a UI indicating a function value changed by the gesture input. The processor 1200 may change in real time a numerical value of the UI indicating the function value by the gesture input. According to an embodiment of the disclosure, the processor 1200 may display the UI indicating a function value, on the touch screen 1100 on which the gesture input is recognized, but the disclosure is not limited thereto. In another embodiment, the electronic device 1000 may further include a plurality of display units, and the processor 1200 may display the UI indicating a function value on a preset display unit from among the plurality of display units, regardless of the touch screen 1100 on which the gesture input is recognized.

Figure 3:
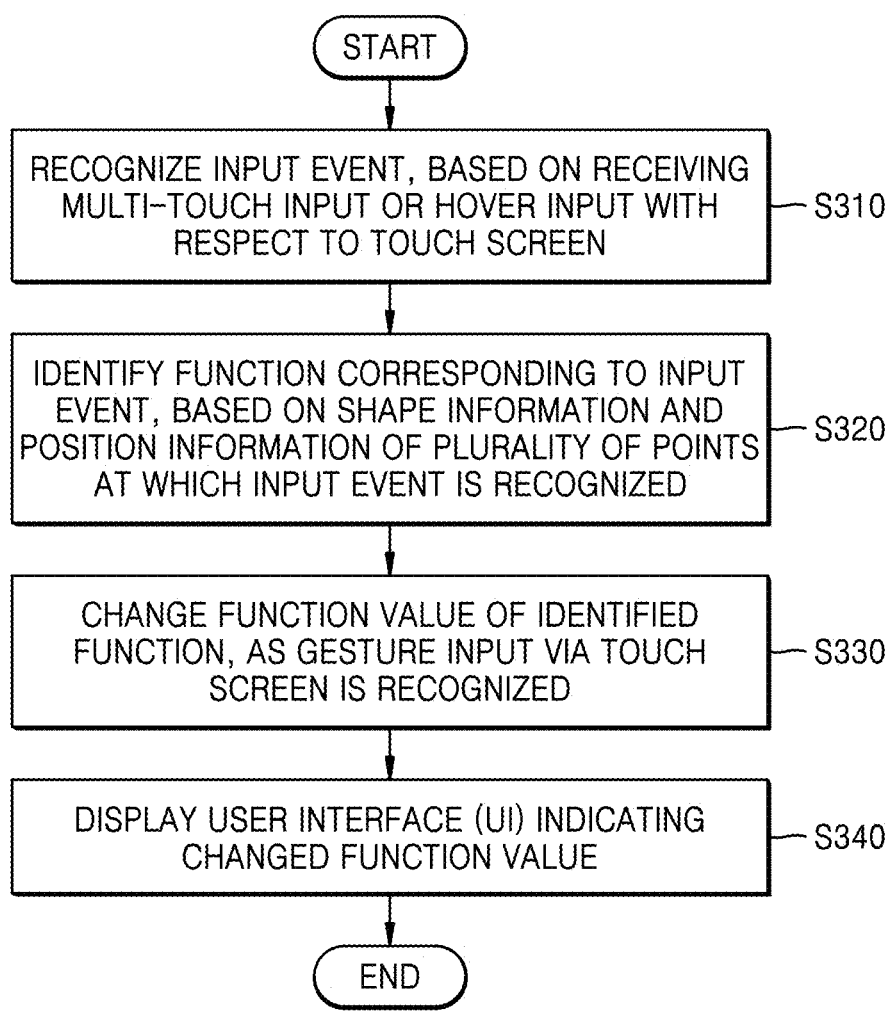
FIG. 3 is a flowchart illustrating a method performed by an electronic device, according to an embodiment of the disclosure.

FIG. 3 is a flowchart illustrating a method performed by the electronic device 1000 according to an embodiment of the disclosure.

In operation S310, the electronic device 1000 recognizes an input event, based on receiving a multi-touch input or a hover input with respect to a touch screen (see 1100 of FIG. 2). According to an embodiment of the disclosure, the touch screen 1100 may receive the multi-touch input of touching two or more positions or areas. When the multi-touch input is received, the electronic device 1000 may recognize a plurality of points on the touch screen 1100 on which the multi-touch input is received, and may obtain position information of the recognized plurality of points. In another embodiment, the touch screen 1100 may include the hover sensor, and the electronic device 1000 may receive, by using the hover sensor, the hover input by a finger or an input device (e.g., a stylus pen, an S-pen, etc.) remote from the touch screen 1100 by a preset distance. The electronic device 1000 may recognize a plurality of points at which the hover input is received, and may obtain position information of the recognized plurality of points.

In operation S320, the electronic device 1000 identifies a function corresponding to the input event, based on shape information and position information of the plurality of points at which the input event is recognized.

According to an embodiment of the disclosure, a function executed by the electronic device 1000 or a vehicle may be mapped to correspond to a combination of positions and shapes of the plurality of points on the touch screen 1100 on which the input event is recognized. A mapping relation between a function and a combination of positions and shapes of the plurality of points may be stored in the form of a LUT in memory (see 1300 of FIG. 2) of the electronic device 1000.

The shape information of the plurality of points may include information about the number of the plurality of points and a distance between each of the plurality of points at which the input event is recognized. According to an embodiment of the disclosure, the electronic device 1000 may obtain the shape information of the plurality of points based on the information about the number of the plurality of points and a distance between each of the plurality of points, and may determine a type of the input event by analyzing the shape information of the plurality of points.

According to an embodiment of the disclosure, the electronic device 1000 may identify a function corresponding to the input event, based on position information of an area in which the input event is recognized, from among a plurality of areas into which the touch screen 1100 is divided. For example, the touch screen 1100 may be divided into two areas including a first area and a second area. The electronic device 1000 may identify a function corresponding to the input event, based on position information of an area in which the input event is recognized from among the first area and the second area of the touch screen 1100.

According to an embodiment of the disclosure, the electronic device 1000 may include the plurality of touch screens 1100, and may identify a function corresponding to the input event, based on position information of the touch screen 1100 at which the input event is recognized, from among the plurality of touch screens 1100.

In operation S330, as a gesture input via the touch screen is recognized, the electronic device 1000 changes a function value of the identified function.

The touch screen 1100 may receive the gesture input, and the electronic device 1000 may obtain information about the gesture input from the touch screen 1100, thereby recognizing the gesture input. The 'gesture input' indicates a motion input by which a user touches the touch screen 1100 with a plurality of fingers and performs scrolling in up and down directions, swiping in left and right directions, or rotating in a clockwise direction or a counterclockwise direction. The electronic device 1000 may obtain information about the number and positions of the plurality of points on the touch screen 1100 on which the input event is recognized, and may recognize the gesture input of the user, based on information about the number and positions of the plurality of points that are moved over time or changed as a touch is released.

According to an embodiment of the disclosure, the electronic device 1000 may change the function value, according to the gesture input. The function value may be changed, according to the gesture input. Here, the 'function value' means a numerical value indicating a state that is changed or adjusted by a function. For example, a function value of a function for 'driver seat air conditioner strength adjustment' may be a numerical value indicating strength of an air conditioner or a temperature indicating a set temperature of the air conditioner that currently operates. The electronic device 1000 may change the function value, based on a change in a position of each of the plurality of points changed by the gesture input. According to an embodiment of the disclosure, the electronic device 1000 may calculate an average value of positional variations of the plurality of points, and may adjust the function value according to the calculated average value.

In operation S340, the electronic device 1000 displays a UI indicating the changed function value. According to an embodiment of the disclosure, the electronic device 1000 may display the UI indicating the function value, on the touch screen 1100 on which the gesture input is recognized. However, the disclosure is not limited thereto. In another embodiment, the electronic device 1000 may further include a plurality of display units as well as the touch screen 1100, and may display the UI indicating the function value on a preset display unit from among the plurality of display units, regardless of the touch screen 1100 on which the gesture input is recognized.

Figure 4A:
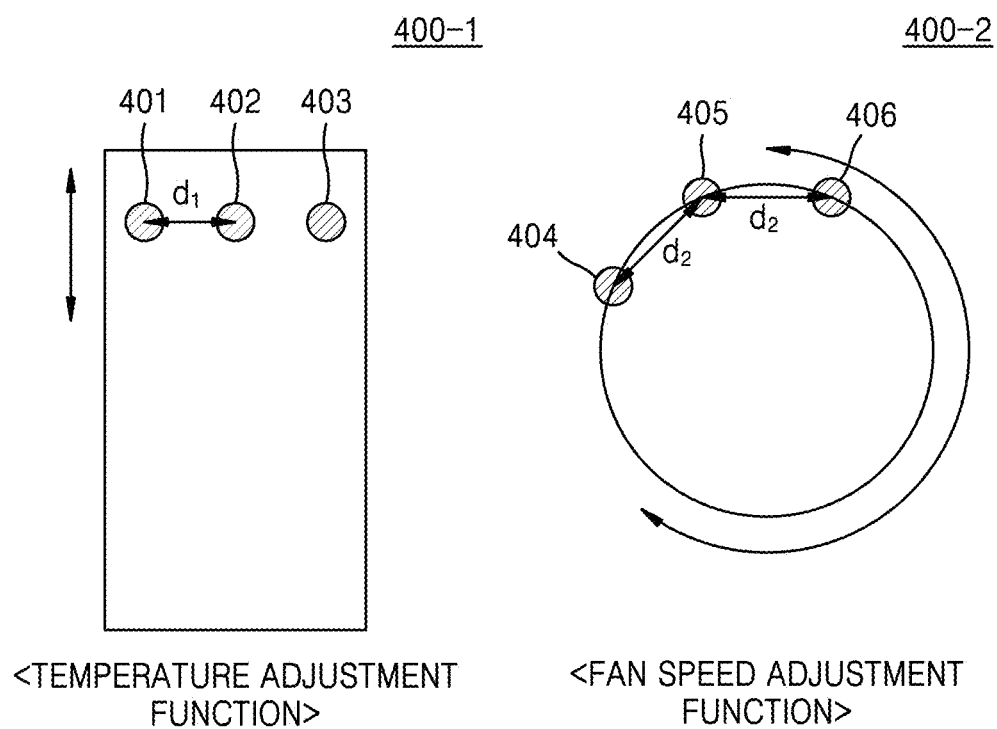
FIG. 4A is a diagram illustrating an example of an input event recognized by an electronic device of the disclosure and a function corresponding thereto according to an embodiment of the disclosure.

FIG. 4A is a diagram illustrating an example of an input event recognized by the electronic device 1000 of the disclosure and a function corresponding thereto according to an embodiment of the disclosure.

Referring to FIG. 4A, the electronic device 1000 may receive a multi-touch input via a touch screen (see 1100 of FIG. 2), and may recognize an input event according to the multi-touch input. In an embodiment shown in FIG. 4A, the electronic device 1000 may recognize the input event from the multi-touch input of touching a plurality of points 401 to 403 or 404 to 406 on the touch screen 1100. The electronic device 1000 may obtain information about the number of the plurality of points 401 to 406 and a distance between each of the plurality of points 401 to 406 at which the multi-touch input is recognized. The electronic device 1000 may identify a function corresponding to the input event, based on the information about the number of and distance between the plurality of points 401 to 406.

Referring to a first embodiment 400-1 shown in the left of FIG. 4A, the number of the plurality of points 401, 402, and 403 on the touch screen 1100 on which the input event is recognized may be 3, and a distance between each of the plurality of points 401, 402, and 403 may be separated by a first distance $d_1$. The electronic device 1000 may obtain information about the number (e.g., 3) of the plurality of points 401, 402, and 403 and a distance (e.g., $d_1$) between each of the plurality of points 401, 402, and 403, and may identify an air conditioner temperature adjustment function as the function corresponding to the input event, based on the obtained information about the number of and distance between the plurality of points 401, 402, and 403.

According to an embodiment of the disclosure, when a distance between each of the plurality of points 401, 402, and 403 is equal to or less than a preset threshold distance, the electronic device 1000 may identify that a type of the input event is a scroll input in up and down directions. In the first embodiment 400-1, as a distance between the first point 401 and the second point 402, a distance between the second point 402 and the third point 403, and a distance between the first point 401 and the third point 403 are all the first distance $d_1$, and the first distance $d_1$ is equal to or less than the preset threshold distance, the electronic device 1000 may identify that the type of the input event is the scroll input in up and down directions.

According to an embodiment of the disclosure, the electronic device 1000 may obtain shape information of arrangement of the plurality of points 404, 405, and 406, based on a distance between each of the plurality of points 404, 405, and 406, and may identify a function corresponding to the input event, based on the shape information. Referring to a second embodiment 400-2 shown in the right of FIG. 4A, the number of the plurality of points 404, 405, and 406 on the touch screen 1100 on which the input event is recognized may be 3, a distance between each of the plurality of points 404, 405, and 406 may be separated by a second distance $d_2$, and the plurality of points 404, 405, and 406 may not be arranged in parallel but may be arranged in a semi-circle shape. The electronic device 1000 may obtain information about the number (e.g., 3) of the plurality of points 404, 405, and 406, a distance (e.g., $d_2$) between each of the plurality of points 404, 405, and 406, and an arrangement shape of the plurality of points 404, 405, and 406, and may identify an air conditioner fan speed adjustment function as the function corresponding to the input event, based on the obtained information about the number of, a distance between, and the arrangement shape of the plurality of points 404, 405, and 406.

According to an embodiment of the disclosure, when a distance between each of the plurality of points 404, 405, and 406 is greater than the preset threshold distance, the electronic device 1000 may identify that a type of the input event is a rotation input in a clockwise direction or a counterclockwise direction. In the second embodiment 400-2, as a distance between the fourth point 404 and the fifth point 405 and a distance between the fifth point 405 and the sixth point 406 are all the second distance $d_2$, and the second distance $d_2$ is greater than the preset threshold distance, the electronic device 1000 may identify that the type of the input event is the rotation input.

Figure 4B:
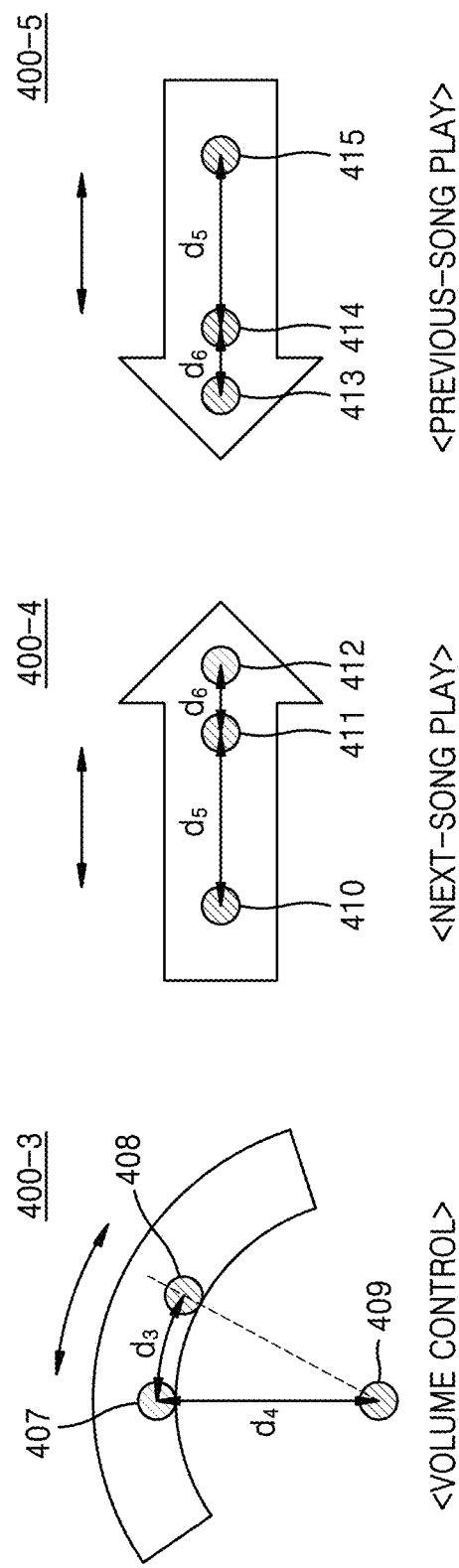
FIG. 4B is a diagram illustrating an example of an input event recognized by an electronic device of the disclosure and a function corresponding thereto according to an embodiment of the disclosure.

FIG. 4B is a diagram illustrating an example of an input event recognized by the electronic device 1000 of the disclosure and a function corresponding thereto according to an embodiment of the disclosure.

Referring to a third embodiment 400-3, the number of a plurality of points 407, 408, and 409 at which an input event is recognized is 3, and a distance between each of the plurality of points 407, 408, and 409 may differ. For example, the seventh point 407 and the eighth point 408 may be arranged to be separated by a third distance $d_3$, and the seventh point 407 and the ninth point 409 may be arranged to be separated by a fourth distance $d_4$. For example, when it is assumed that a user touches a touch screen (see 1100 of FIG. 2) with a right hand, the seventh point 407 may be touched by an index finger of the user, the eighth point 408 may be touched by a middle finger of the user, and the ninth point 409 may be touched by a thumb of the user. The electronic device 1000 may obtain information about the number (e.g., 3) of the plurality of points 407, 408, and 409, distances (e.g., $d_3$ and $d_4$) between the plurality of points 407, 408, and 409, and an arrangement shape of the plurality of points 407, 408, and 409, and may identify a type of an input event, based on the obtained information about the number of, distances between, and the arrangement shape of the plurality of points 407, 408, and 409. The electronic device 1000 may identify a volume control function of a music application as a function corresponding to the type of the input event.

Referring to a fourth embodiment 400-4, the number of a plurality of points 410, 411, and 412 at which an input event is recognized is 3, and a distance between each of the plurality of points 410, 411, and 412 may differ. For example, the tenth point 410 and the eleventh point 411 may be arranged to be separated by a fifth distance $d_5$, and the eleventh point 411 and the twelfth point 412 may be arranged to be separated by a sixth distance do. For example, a size of the fifth distance $d_5$ may be greater than a size of the sixth distance de. Also, the plurality of points 410, 411, and 412 may be arranged in parallel without a difference between heights. The electronic device 1000 may obtain information about the number (e.g., 3) of the plurality of points 410, 411, and 412, distances (e.g., $d_5$ and $d_6$) between the plurality of points 410, 411, and 412, and an arrangement shape of the plurality of points 410, 411, and 412, and may identify a type of an input event, based on the obtained information about the number of, distances between, and the arrangement shape of the plurality of points 410, 411, and 412. The electronic device 1000 may identify a next-song play function of the music application as a function corresponding to the type of the input event.

Referring to a fifth embodiment 400-5, the number of a plurality of points 413, 414, and 415 at which an input event is recognized is 3, and a distance between each of the plurality of points 413, 414, and 415 may differ. Distances between the plurality of points 413, 414, and 415 in the fifth embodiment 400-5 are different from those in the fourth embodiment 400-4. For example, the thirteenth point 413 and the fourteenth point 414 may be arranged to be separated by the sixth distance $d_6$, and the fourteenth point 414 and the fifteenth point 415 may be arranged to be separated by the fifth distance $d_5$. The electronic device 1000 may obtain information about the number (e.g., 3) of the plurality of points 413, 414, and 415, distances (e.g., $d_5$ and $d_6$) between the plurality of points 413, 414, and 415, and an arrangement shape of the plurality of points 413, 414, and 415, and may identify a previous-song play function of the music application as a function corresponding to input event, based on the obtained information about the number of, distances between, and the arrangement shape of the plurality of points 413, 414, and 415.

The electronic device 1000 according to embodiments shown in FIGS. 4A and 4B automatically identifies a corresponding function, based on information of the number and shape of a plurality of points at which a multi-touch input or a hover input of a user is recognized, so that the user may execute the function even when the user does not search for a UI indicating the user-desired function and correctly touch a display position of the UI. Therefore, the electronic device 1000 according to an embodiment of the disclosure may improve user convenience in manipulation, and may provide a technical effect of preventing occurrence of traffic accident in advance as concentration is not interrupted when a user is a driver.

Figure 5A:
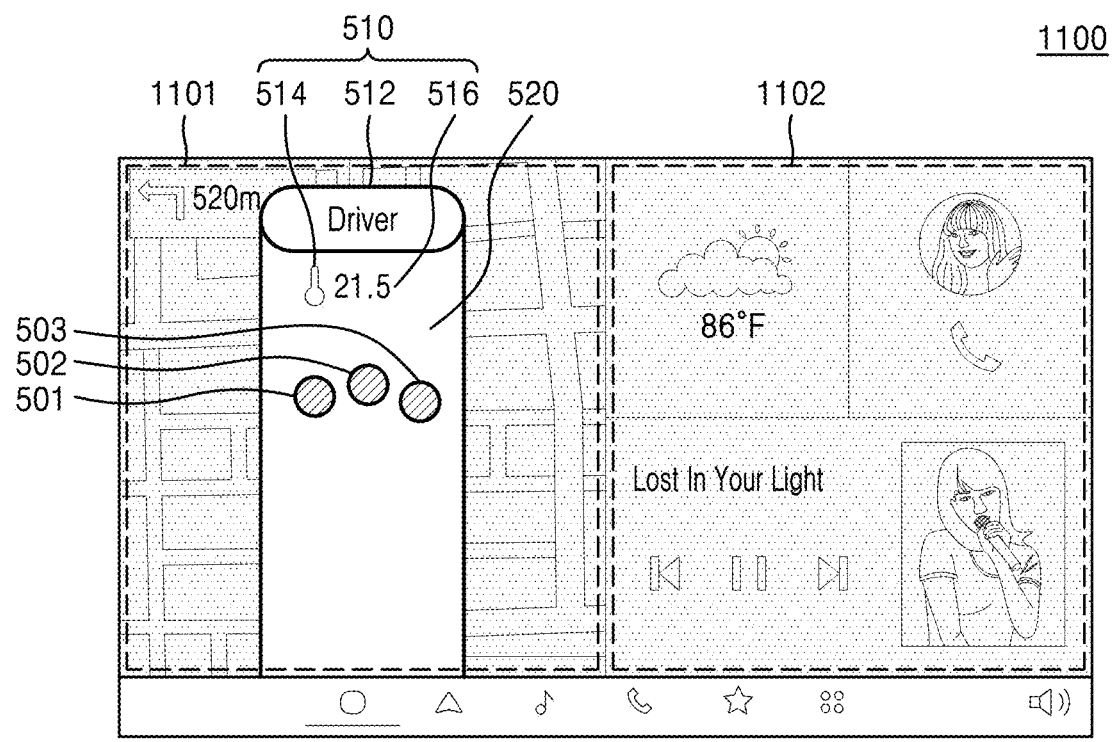
FIG. 5A is a diagram illustrating an embodiment in which an electronic device of the disclosure performs a function corresponding to an input event, based on an area of a touch screen on which the input event is recognized according to an embodiment of the disclosure.

FIG. 5A is a diagram illustrating an embodiment in which the electronic device 1000 of the disclosure performs a function corresponding to an input event, based on an area of the touch screen 1100 on which the input event is recognized according to an embodiment of the disclosure.

Referring to FIG. 5A, the touch screen 1100 may include a plurality of areas including a first area 1101 and a second area 1102. In FIG. 5A, the first area 1101 and the second area 1102 are areas that are not physically segmented but are divided based on positions at which a plurality of points 501, 502, and 503 are recognized, according to a multi-touch input or a hover input being received. However, the disclosure is not limited thereto, and the touch screen 1100 may include a plurality of areas more than 3.

According to an embodiment of the disclosure, the first area 1101 may be positioned adjacent to a driver seat, and the second area 1102 be positioned adjacent to a passenger seat.

The electronic device 1000 may identify a function corresponding to an input event, based on position information of an area in which the input event by a multi-touch input or a hover input of a user is recognized from among the plurality of areas 1101 and 1102 on the touch screen 1100. In the embodiment shown in FIG. 5A, when the multi-touch input or the hover input of the user is recognized at the plurality of points 501, 502, and 503 of the first area 1101 of the touch screen 1100, a processor (see 1200 of FIG. 2) of the electronic device 1000 may obtain position coordinate information of the plurality of points 501, 502, and 503. The processor 1200 may identify where a position of a center point of position coordinates of each of the plurality of points 501, 502, and 503 is on the touch screen 1100. As a result of the identifying, when the positions of the center points of the position coordinates of the plurality of points 501, 502, and 503 are on the first area 1101, the processor 1200 may identify a function corresponding to an input event recognized on the first area 1101. In the embodiment shown in FIG. 5A, the processor 1200 may identify a driver seat air conditioner set temperature adjustment function as the function corresponding to the input event recognized on the first area 1101.

According to an embodiment of the disclosure, the processor 1200 may obtain position information of an area of the touch screen 1100 on which the plurality of points 501, 502, and 503 are recognized, and may obtain shape information of the plurality of points 501, 502, and 503. The processor 1200 may identify a function corresponding to an input event, based on the position information and the shape information of the plurality of points 501, 502, and 503 on the touch screen 1100 on which the input event is recognized. Although not illustrated, when a shape of the plurality of points 501, 502, and 503 recognized on the first area 1101 is the same shape as a second embodiment (see 400-2 of FIG. 4A) shown in FIG. 4A, the processor 1200 may identify a driver seat air conditioner fan speed adjustment function as the function corresponding to the input event.

The processor 1200 may control the electronic device 1000 or elements of a vehicle to perform the identified function. For example, when the identified function indicates temperature adjustment or fan speed adjustment for an air conditioner, the processor 1200 may transmit, to the air conditioner of the vehicle, operation information about the function for the vehicle to execute the temperature adjustment or fan speed adjustment function.

The processor 1200 may display, on the touch screen 1100, a function information UI 510 that graphically represents information about an identified function. The 'function information UI 510' may be a GUI that represents information about a function identified by the processor 1200, in the form of text, a number, a figure, an icon, or an image. According to an embodiment of the disclosure, the function information UI 510 may include text 512 indicating function information, an icon 514, and a function value UI 516 indicating a function value. In the embodiment shown in FIG. 5A, the function information UI 510 may include the text 512 of 'Driver' meaning a driver seat, the icon 514 in the form of a thermometer indicating a temperature of a driver seat air conditioner, and the function value UI 516 indicating a number of '21.5' that is a set temperature value of an air conditioner. According to an embodiment of the disclosure, the processor 1200 may display the function information UI 510 on the first area 1101 that is an area on which the input event is recognized from among the plurality of areas 1101 and 1102 of the touch screen 1100.

According to an embodiment of the disclosure, the processor 1200 may display, on the touch screen 1100, a gesture UI 520 for deriving a gesture input of a user. The gesture UI 520 may be a graphic UI for deriving a user's gesture input of moving in up and down directions or left and right directions or rotating in a clockwise direction or a counter-clockwise direction, while a multi-touch input or a hover input with respect to the plurality of points 501, 502, and 503 is maintained. In the embodiment shown in FIG. 5A, the gesture UI 520 may be a UI for deriving a scroll input in up and down directions of the plurality of points 501, 502, and 503.

Figure 5B:
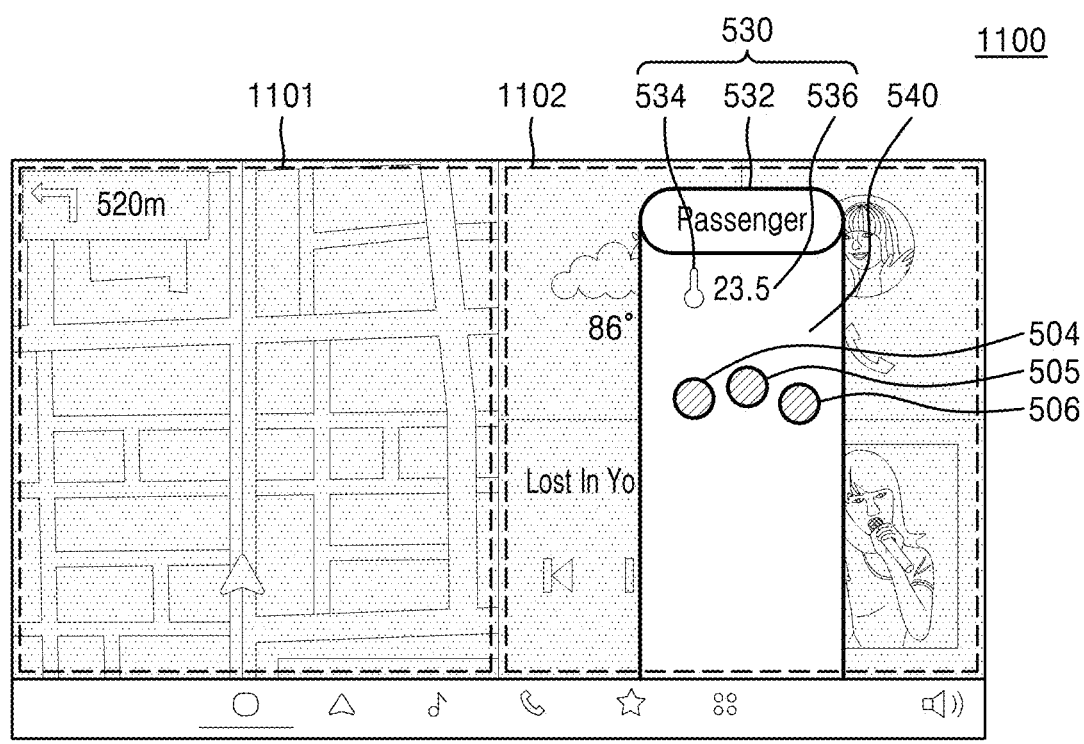
FIG. 5B is a diagram illustrating an embodiment in which an electronic device of the disclosure performs a function corresponding to an input event, based on an area of a touch screen on which the input event is recognized according to an embodiment of the disclosure.

FIG. 5B is a diagram illustrating an embodiment in which the electronic device 1000 of the disclosure performs a function corresponding to an input event, based on an area of the touch screen 1100 on which the input event is recognized according to an embodiment of the disclosure.

As the embodiment shown in FIG. 5B is equal to the embodiment of FIG. 5A, except that an input event is recognized on the second area 1102 of the touch screen 1100, descriptions overlapping those of FIG. 5A are not provided here.

Referring to FIG. 5B, when an input event by a multi-touch input or a hover input of a user is recognized at a plurality of points 504, 505, and 506 on the second area 1102 of the touch screen 1100, a processor 1200 (see 1200 of FIG. 2) of the electronic device 1000 may obtain position coordinate information of the plurality of points 504, 505, and 506, may identify a position of a center point of position coordinates of each of the plurality of points 504, 505, and 506, and thus, may identify a function corresponding to the input event, based on the identified position of the center point. In the embodiment shown in FIG. 5B, the processor 1200 may identify a passenger seat air conditioner set temperature adjustment function as the function corresponding to the input event recognized on the second area 1102.

The processor 1200 may control the electronic device 1000 or elements of a vehicle to perform the identified function. For example, when the identified function indicates temperature adjustment or fan speed adjustment for an air conditioner, the processor 1200 may transmit, to the air conditioner of the vehicle, operation information about the function for the vehicle to execute the temperature adjustment or fan speed adjustment function.

The processor 1200 may display, on the touch screen 1100, a function information UI 530 that graphically represents information about an identified function. In the embodiment shown in FIG. 5B, the processor 1200 may display the function information UI 530 including text 532 of 'Passenger' meaning a passenger seat, an icon 534 in the form of a thermometer indicating a temperature of a passenger seat air conditioner, and a function value UI 536 indicating a number of '23.5' that is a set temperature value of an air conditioner.

According to an embodiment of the disclosure, the processor 1200 may display, on the touch screen 1100, a gesture UI 540 for deriving a gesture input of a user. In the embodiment shown in FIG. 5B, the gesture UI 540 may be a UI for deriving a scroll input in up and down directions of the plurality of points 504, 505, and 506.

The electronic device 1000 according to the embodiments shown in FIGS. 5A and 5B may identify different functions, according to position information of an input event recognized via the plurality of areas 1101 and 1102 in one touch screen 1100. For example, when an input event is recognized on the first area 1101 adjacent to a driver seat from among the plurality of areas 1101 and 1102 of the touch screen 1100, a function related to the driver seat may be identified, when an input event is recognized in the second area 1102 adjacent to a passenger seat, a function related to the passenger seat may be identified, and the identified function may be automatically executed. Therefore, the electronic device 1000 according to an embodiment of the disclosure may intuitively execute a function even when a driver or a passenger of a passenger seat does not search for a UI related to the function so as to execute the function associated with a driver seat or the passenger seat and does not correctly touch a display position of the UI, so that user convenience may be improved.

Figure 6:
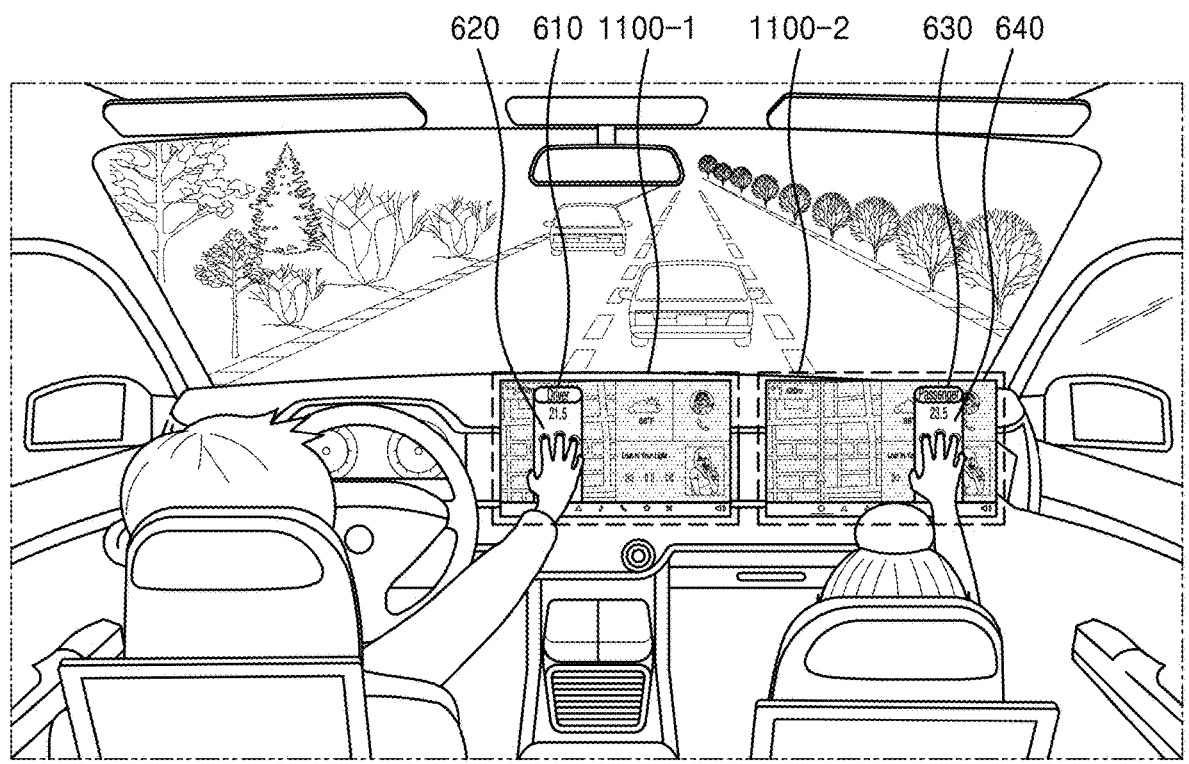
FIG. 6 is a diagram illustrating an embodiment in which an electronic device of the disclosure performs a function corresponding to an input event, based on a position of a touch screen on which the input event is recognized from among a plurality of touch screens according to an embodiment of the disclosure.

FIG. 6 is a diagram illustrating an embodiment in which the electronic device 1000 of the disclosure performs a function corresponding to an input event, based on a position of a touch screen on which the input event is recognized from among a plurality of touch screens 1100-1 and 1100-2 according to an embodiment of the disclosure.

Referring to FIG. 6, the electronic device 1000 may include the plurality of touch screens 1100-1 and 1100-2. In an embodiment shown in FIG. 6, the first touch screen 1100-1 may be positioned adjacent to a driver seat and the second touch screen 1100-2 may be positioned adjacent to a passenger seat. However, the disclosure is not limited thereto, and the electronic device 1000 may include three or more touch screens.

The electronic device 1000 may identify a function corresponding to an input event, based on a position of a touch screen on which the input event is recognized from among the plurality of touch screens 1100-1 and 1100-2. According to an embodiment of the disclosure, when the input event is recognized in the first touch screen 1100-1 by a multi-touch input or a hover input of a user, a processor (see 1200 of FIG. 2) of the electronic device 1000 may identify a function set to correspond to the first touch screen 1100-1. In the embodiment shown in FIG. 6, the processor 1200 may identify a driver seat air conditioner temperature adjustment function as the function corresponding to the input event recognized by the multi-touch input or the hover input to the first touch screen 1100-1.

When an input event is recognized in the second touch screen 1100-2, the processor 1200 identify a function set to correspond to the second touch screen 1100-2. In the embodiment shown in FIG. 6, the processor 1200 may identify a passenger seat air conditioner temperature adjustment function as the function corresponding to the input event recognized by the multi-touch input or the hover input to the second touch screen 1100-2.

According to an embodiment of the disclosure, the processor 1200 may respectively display, on the plurality of touch screens 1100-1 and 1100-2, function information UIs 610 and 630 that graphically show information about identified functions. The 'function information UI 610 or 630' may be a GUI that represents information about a function identified by the processor 1200, in the form of text, a number, a figure, an icon, or an image. The processor 1200 may display the corresponding function information UI 610 or 630 on an area in which an input event is recognized from among the plurality of touch screens 1100-1 and 1100-2. In the embodiment shown in FIG. 6, the processor 1200 may display the function information UI 610 about a driver seat temperature adjustment function on the first touch screen 1100-1, and may display the function information UI 630 about a passenger seat temperature adjustment function on the second touch screen 1100-2.

According to an embodiment of the disclosure, the processor 1200 may display gesture UIs 620 and 640 for deriving a gesture input of a user on the plurality of touch screens 1100-1 and 1100-2. In the embodiment shown in FIG. 6, the processor 1200 may display the gesture UI 620 for deriving a gesture input related to a driver seat temperature adjustment function on the first touch screen 1100-1, and may display the gesture UI 640 for deriving a gesture input related to a passenger seat temperature adjustment function on the second touch screen 1100-2.

The electronic device 1000 according to the embodiment shown in FIG. 6 may identify different functions, based on a position of a touch screen on which an input event by a multi-touch input or a hover input of a user is recognized from among the plurality of touch screens 1100-1 and 1100-2, and may automatically execute the identified function. The electronic device 1000 according to an embodiment of the disclosure may allow a desired function to be automatically executed, via a touch screen positioned adjacent to a driver seat or a passenger seat in a multi-screen environment, thereby improving user convenience in manipulation.

Figure 7:
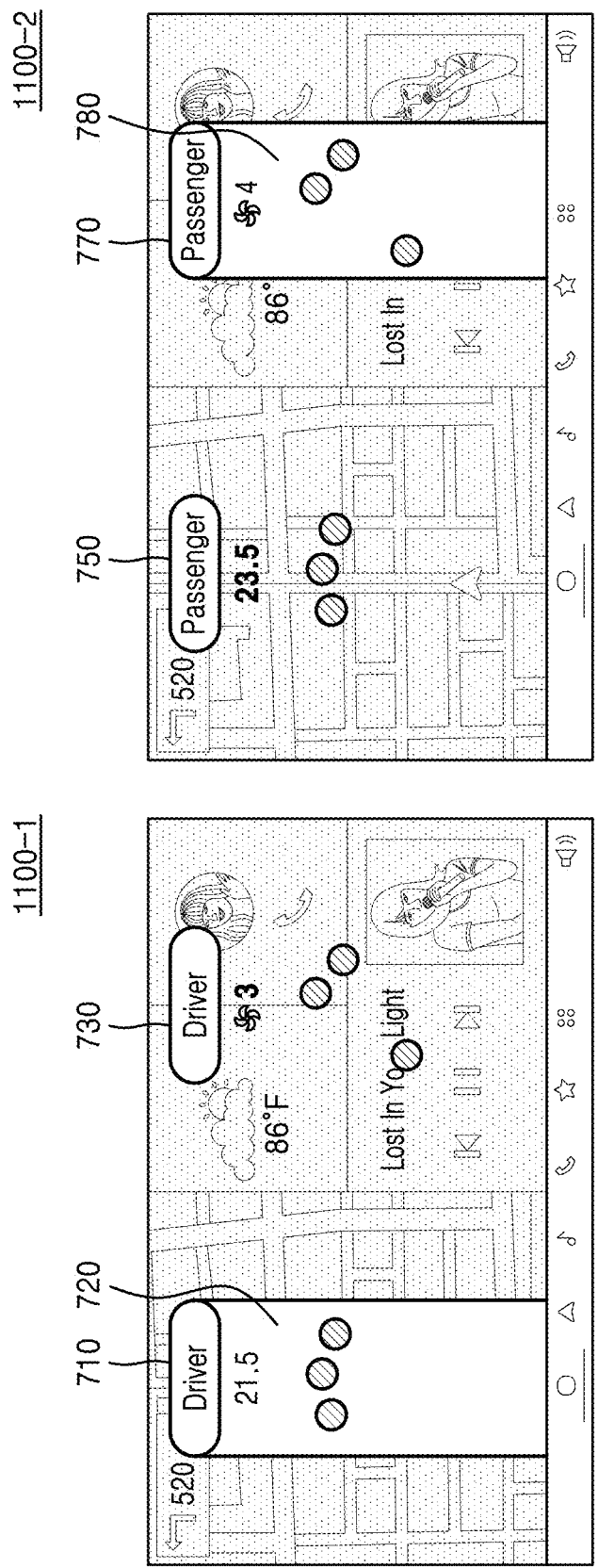
FIG. 7 is a diagram illustrating an embodiment in which an electronic device of the disclosure performs a function corresponding to an input event, based on an area on which an input event is recognized by each of a plurality of touch screens and a position of a touch screen on which the input event is recognized according to an embodiment of the disclosure.

FIG. 7 is a diagram illustrating an embodiment in which the electronic device 1000 of the disclosure performs a function corresponding to an input event, based on an area on which an input event is recognized by each of the plurality of touch screens 1100-1 and 1100-2 and a position of a touch screen on which the input event is recognized according to an embodiment of the disclosure.

Referring to FIG. 7, the electronic device 1000 may include the plurality of touch screens 1100-1 and 1100-2. The first touch screen 1100-1 may be divided into a plurality of areas including a first area 1101 and a second area 1102. The first area 1101 and the second area 1102 are areas that are not physically segmented but are divided based on a position at which an input event by a multi-touch input or a hover input is recognized. The second touch screen 1100-2 may be divided into a plurality of areas including a third area 1103 and a fourth area 1104. In the embodiment of FIG. 7, it is illustrated that each of the first touch screen 1100-1 and the second touch screen 1100-2 includes two areas, but the disclosure is not limited thereto. Each of the first touch screen 1100-1 and the second touch screen 1100-2 may include a plurality of areas more than 3.

The electronic device 1000 may identify a function corresponding to an input event, based on a position at which the input event is recognized, from among the plurality of areas 1101, 1102, 1103, and 1104 included in the plurality of touch screens 1100-1 and 1100-2. According to an embodiment of the disclosure, from among the plurality of touch screens 1100, the first touch screen 1100-1 may be positioned adjacent to a driver seat and the second touch screen 1100-2 may be positioned adjacent to a passenger seat. According to an embodiment of the disclosure, when the input event is recognized by a multi-touch input or a hover input in the plurality of areas 1101 and 1102 in the first touch screen 1100-1, a processor (see 1200 of FIG. 2) of the electronic device 1000 may identify functions respectively set to correspond to the plurality of areas 1101 and 1102, from among functions related to the driver seat or a driver. In the embodiment shown in FIG. 7, when the input event is recognized in the first area 1101 of the first touch screen 1100-1, the processor 1200 may identify a driver seat air conditioner temperature adjustment function as the function corresponding to the input event. In another embodiment, when the input event is recognized by the multi-touch input or the hover input of a user in the second area 1102 in the first touch screen 1100-1, the processor 1200 may identify a function set to correspond to the second area 1102. In the embodiment shown in FIG. 7, when the input event is recognized in the second area 1102, the processor 1200 may identify a driver seat air conditioner fan speed adjustment function as the function corresponding to the input event.

Equally, when the input event is recognized by a multi-touch input or a hover input in the plurality of areas 1103 and 1104 in the second touch screen 1100-2, the electronic device 1000 may identify functions respectively set to correspond to the plurality of areas 1103 and 1104, from among functions related to the passenger seat or a passenger. In the embodiment shown in FIG. 7, when the input event is recognized in the third area 1103 of the second touch screen 1100-2, the processor 1200 may identify a passenger seat air conditioner temperature adjustment function as the function corresponding to the input event. In another embodiment, when the input event is recognized by the multi-touch input or the hover input of the user in the fourth area 1104 in the second touch screen 1100-2, the processor 1200 may identify a function set to correspond to the fourth area 1104. In the embodiment shown in FIG. 7, when the input event is recognized in the fourth area 1104, the processor 1200 may identify a passenger seat air conditioner fan speed adjustment function as the function corresponding to the input event.

The processor 1200 may display, on the touch screen 1100, function information UIs 710, 730, 750, and 770 that graphically show information about identified functions.

The processor 1200 may display a gesture UI 720 or 780 to derive a gesture input of a user, on the touch screen 1100-1 or 1100-2. The gesture UI 720 or 780 may be a graphic UI for deriving a user's gesture input of moving in up and down directions or left and right directions or rotating in a clockwise direction or a counterclockwise direction, while a multi-touch input or a hover input with respect to a plurality of points is maintained. According to an embodiment of the disclosure, the processor 1200 may display the gesture UI 720 or 780 on an area in which a multi-touch input or a hover input of a user is maintained, from among a plurality of areas in a touch screen. In the embodiment shown in FIG. 7, when a driver touches the first area 1101 of the first touch screen 1100-1, the processor 1200 may recognize a touch input with respect to the first area 1101, and may display the gesture UI 720 on the first area 1101 on which the touch is maintained. Equally, when a passenger of a passenger seat touches the fourth area 1104 of the second touch screen 1100-2, the processor 1200 may recognize a touch input with respect to the fourth area 1104, and may display the gesture UI 780 on the fourth area 1104 on which the touch is maintained.

Figure 8:
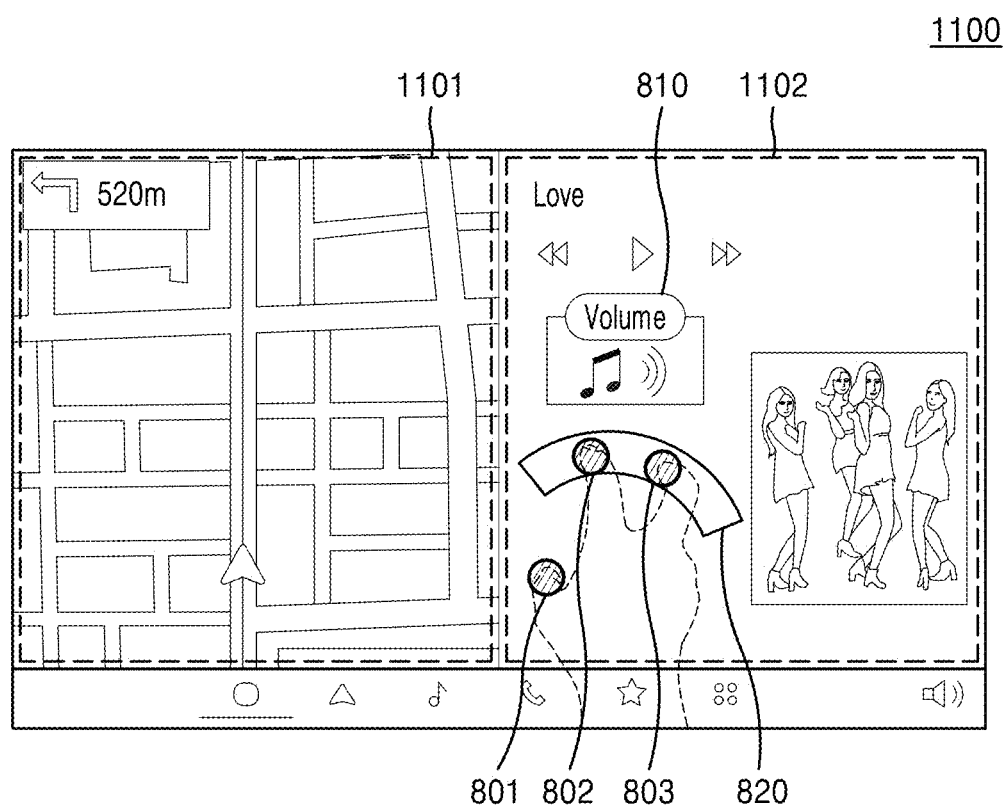
FIG. 8 is a diagram illustrating an embodiment in which an electronic device of the disclosure identifies a function corresponding to an input event, based on operation state information, and performs the function according to an embodiment of the disclosure.

FIG. 8 is a diagram illustrating an embodiment in which the electronic device 1000 of the disclosure identifies a function corresponding to an input event, based on operation state information, and performs the function according to an embodiment of the disclosure.

Referring to FIG. 8, the electronic device 1000 may obtain the operation state information including information about at least one of a performed function, a performed operation, or an executed application, and may identify a function corresponding to an input event, based on a position and shape information of the input event recognized via the touch screen 1100, and the operation state information.

A processor (see 1200 of FIG. 2) of the electronic device 1000 may obtain information about a currently-executed application, and may identify a predetermined function corresponding to an input event, from among at least one function provided by the application. In an embodiment shown in FIG. 8, in a case where the electronic device 1000 currently executes a music application, and receives an input event at a plurality of points 801, 802, and 803 by a multi-touch input of a user which is received via the touch screen 1100, the processor 1200 may identify a function corresponding to the input event from among volume adjustment, next-song play, or previous-song play which are provided by the music application. Based on information about the number of the plurality of points 801, 802, and 803 and a distance between each of the plurality of points 801, 802, and 803 at which the input event is recognized, the processor 1200 may identify the volume adjustment function as the function corresponding to the input event.

The processor 1200 may display function information UI 810 indicating information about the identified function. According to an embodiment of the disclosure, the processor 1200 may display the function information UI 810 on a second area 1102 that is an area in which the input event is recognized from among a plurality of areas 1101 and 1102 of the touch screen 1100. In the embodiment shown in FIG. 8, the function information UI 810 may include an icon that visually displays the volume adjustment function of the music application.

The processor 1200 may perform an operation according to the identified function. For example, the processor 1200 may perform an operation of adjusting a volume of music being played in the music application. According to an embodiment of the disclosure, the processor 1200 may display a gesture UI 820 of deriving a gesture input of a user to adjust a volume of music.

According to an embodiment of the disclosure, the processor 1200 may identify a function corresponding to the input event, based on a position on the touch screen 1100 on which an execution screen of an application is displayed. In the embodiment shown in FIG. 8, the touch screen 1100 may include the first area 1101 and the second area 1102, and an execution screen of a navigation application is displayed on the first area 1101, and an execution screen of the music application is displayed on the second area 1102. As the multi-touch input of the user is recognized in the second area 1102 in which the execution screen of the music application is displayed, the processor 1200 identifies the function provided by the music application, but an embodiment of the disclosure is not limited to that shown in FIG. 8. In another embodiment, when multi-touch input is recognized in the first area 1101 in which the execution screen of the navigation application is displayed, the processor 1200 may identify a function provided by the navigation application.

The electronic device 1000 according to the embodiment shown in FIG. 8 may identify a related function by reflecting context according to a currently-performed function, a currently-performed operation, or a currently-executed application, and may execute the identified function, so that a user can intuitively execute the function related to an application, and thus, user convenience may be improved.

Figure 9:
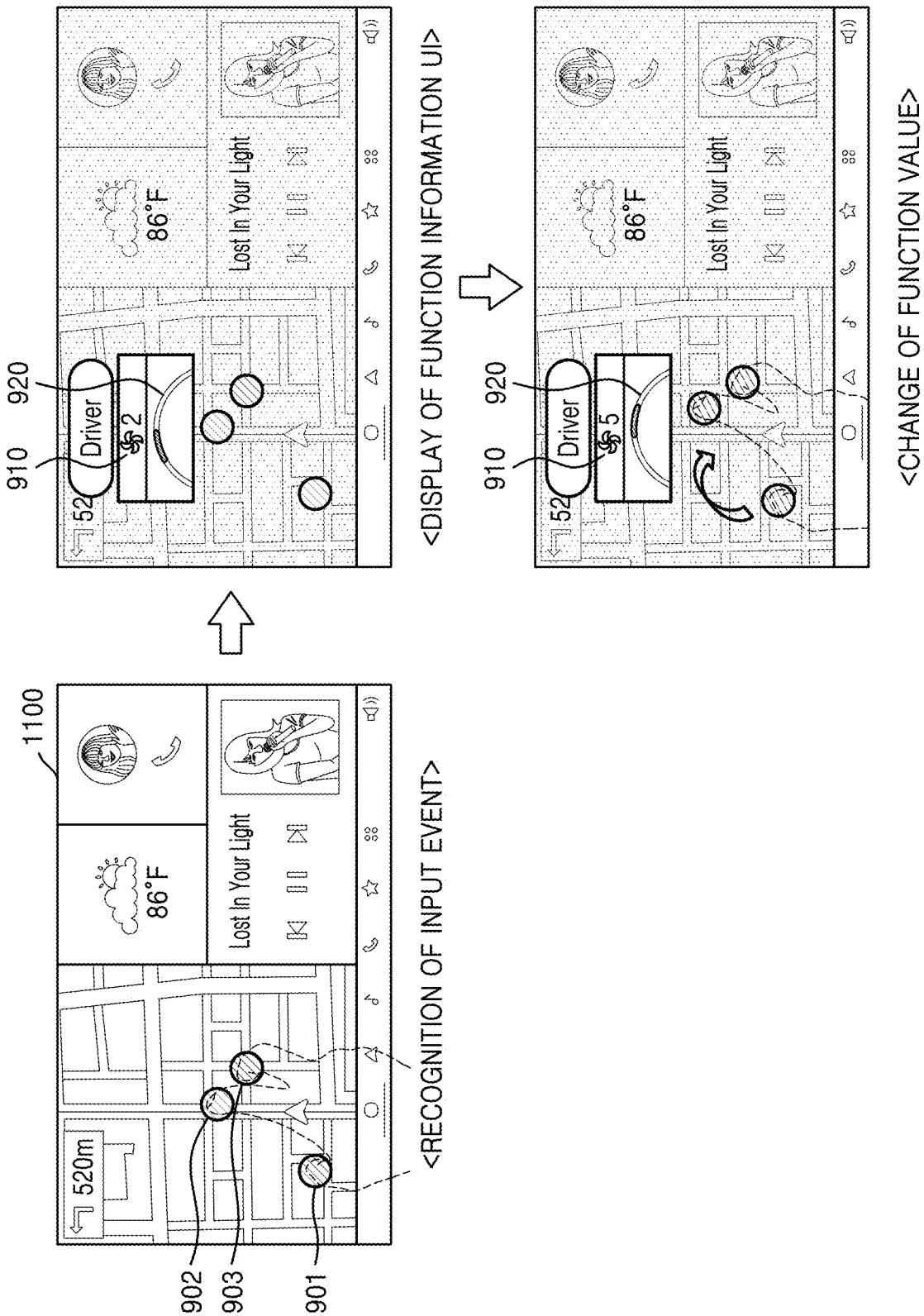
FIG. 9 illustrates an embodiment in which an electronic device of the disclosure changes a function value of a function, based on an input event being recognized according to an embodiment of the disclosure.

FIG. 9 illustrates an embodiment in which the electronic device 1000 of the disclosure changes a function value of a function, based on an input event being recognized according to an embodiment of the disclosure.

Referring to FIG. 9, the electronic device 1000 may recognize an input event, based on receiving a multi-touch input or a hover input of a user via the touch screen 1100. According to an embodiment of the disclosure, the electronic device 1000 may recognize the multi-touch input of the user which touch a plurality of points 901, 902, and 903 on the touch screen 1100.

The electronic device 1000 may identify a function set to correspond to the input event. A processor 1200 (see 1200 of FIG. 2) of the electronic device 1000 may identify the function corresponding to the input event, based on information about positions and shape of the plurality of points 901, 902, and 903 at which the input event is recognized. According to an embodiment of the disclosure, the processor 1200 may obtain shape information of the plurality of points 901, 902, and 903, based on the number of the plurality of points 901, 902, and 903 and a distance between each of the plurality of points 901, 902, and 903, and may obtain information of a position at which the input event is recognized, based on a position of a center point of position coordinates of the plurality of points 901, 902, and 903. In an embodiment shown in FIG. 9, the processor 1200 may identify a driver seat air conditioner fan speed adjustment function as a function corresponding to the input event, based on the information about the positions and shape of the plurality of points 901, 902, and 903.

The electronic device 1000 may display, on the touch screen 1100, a function information UI 910 that graphically represents information about the identified function. The 'function information UI 910' may be a GUI that represents information about a function identified by the processor 1200, in the form of text, a number, a figure, an icon, or an image. In the embodiment shown in FIG. 9, the function information UI 910 may include text of 'Driver' meaning a driver seat, an icon indicating a fan speed of a driver seat air conditioner, and a number of '2' indicating a function value.

According to an embodiment of the disclosure, the processor 1200 may display not only the function information UI 910 but also display a gesture UI 920 on the touch screen 1100. The gesture UI 920 may be a graphic UI for deriving a user's gesture input of moving in up and down directions or left and right directions or rotating in a clockwise direction or a counterclockwise direction, while a multi-touch input or a hover input with respect to the plurality of points 901, 902, and 903 is maintained.

The electronic device 1000 may receive a user's gesture input of moving in up and down directions or left and right directions or rotating in a clockwise direction or a counterclockwise direction, while touch inputs or a hover input with respect to the plurality of points 901, 902, and 903 are maintained, according to the gesture UI 920. The processor 1200 may recognize the gesture input received via the touch screen 1100, and may change a function value of a function, according to the gesture input. The 'function value' means a numerical value indicating a state that is changed or adjusted by a function. For example, a function value of a function for 'driver seat air conditioner strength adjustment' may be a numerical value indicating strength of an air conditioner that currently operates, or may be a temperature indicating a set temperature of the air conditioner.

The processor 1200 may change the function value, based on a change in a position of each of the plurality of points 901, 902, and 903 changed by the gesture input. According to an embodiment of the disclosure, the electronic device 1000 may calculate an average value of positional variations of the plurality of points 901, 902, and 903, and may adjust the function value according to the calculated average value.

The processor 1200 may display a UI indicating a function value changed by the gesture input. In the embodiment shown in FIG. 9, the processor 1200 may display the function information UI 910 including a number indicating a numerical value of a driver seat air conditioner fan speed. The numerical value included in the function information UI 910 may be changed, in response to a user's gesture input. For example, the numerical value displayed by the function information UI 910 may be changed from 2 to 5, in response to a user's gesture input.

Figure 10:
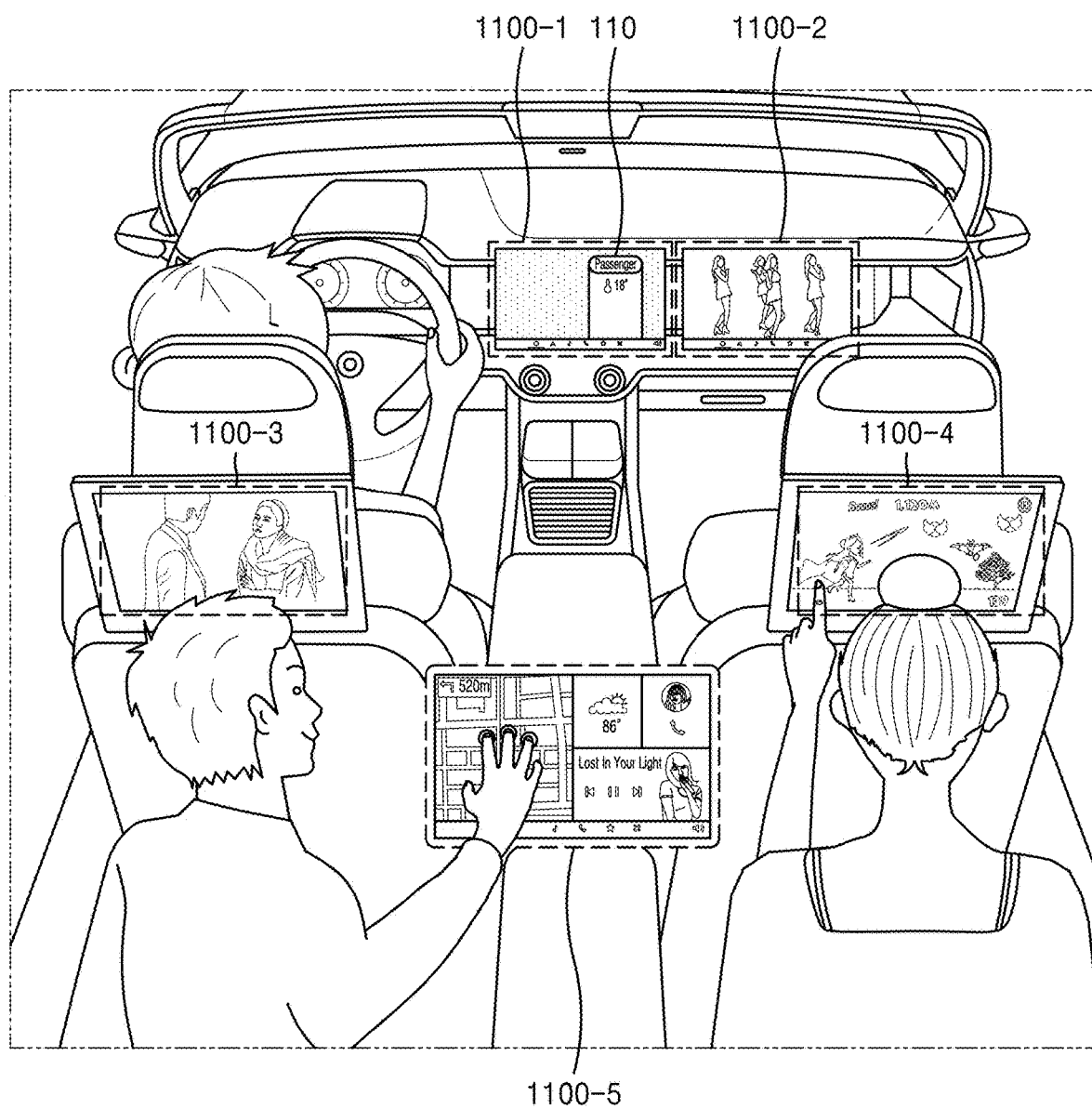
FIG. 10 is a diagram illustrating an embodiment in which an electronic device of the disclosure displays a function information user interface (UI) on a preset display unit from among a plurality of displays according to an embodiment of the disclosure.

FIG. 10 is a diagram illustrating an embodiment in which the electronic device 1000 of the disclosure displays a function information UI on a preset display unit from among a plurality of displays 1100-1 to 1100-5 according to an embodiment of the disclosure.

Referring to FIG. 10, the electronic device 1000 may include the plurality of displays 1100-1 to 1100-5. For example, from among the plurality of displays 1100-1 to 1100-5, the first display 1100-1 may be configured as a CID, the second display 1100-2 may be configured as a passenger set display, and the third display 1100-3 and the fourth display 1100-4 may be configured as rear seat displays. The fifth display 1100-5 may be a display provided on an armrest of a rear set.

At least one display from among the plurality of displays 1100-1 to 1100-5 may be implemented as a touch screen. In the embodiment shown in FIG. 10, the fifth display 1100-5 may be configured as a touch screen that receives a multi-touch input or a hover input of a user.

The electronic device 1000 may display a function information UI 110 on a preset display from among the plurality of displays 1100-1 to 1100-5, regardless of a touch screen on which an input event is recognized. In the embodiment shown in FIG. 10, the electronic device 1000 may receive a multi-touch input of a user via the fifth display 1100-5, and may recognize an input event according to the received multi-touch input. According to an embodiment of the disclosure, a display on which the function information UI 110 from among the plurality of displays 1100-1 to 1100-5 is displayed may be preset as a default. However, the disclosure is not limited thereto, and the electronic device 1000 may designate, in response to a user input, at least one display on which the function information UI 110 from among the plurality of displays 1100-1 to 1100-5 is displayed. For example, the first display 1100-1 from among the plurality of displays 1100-1 to 1100-5 may be set to display the function information UI 110 in advance. The electronic device 1000 may display the function information UI 110 on the first display 1100-1, not the fifth display 1100-5 on which the input event is recognized.

The electronic device 1000 according to the embodiment shown in FIG. 10 may display the function information UI 110 on the preset first display 1100-1, not the fifth display 1100-5 on which the multi-touch input or the hover input of the user is recognized. Therefore, the electronic device 1000 according to an embodiment of the disclosure may provide a technical effect by which, even when a rear seat passenger changes a function value, a driver or a passenger of a passenger seat can intuitively check the changed function value.

Figure 11:
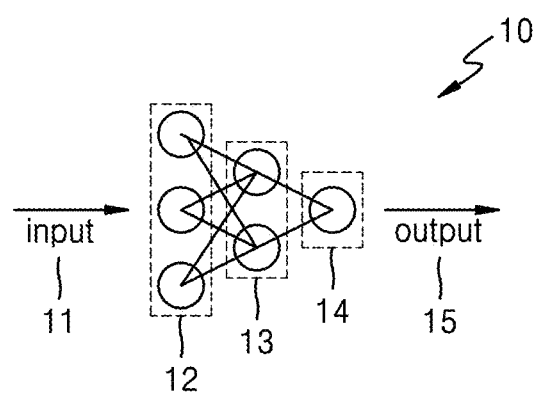
FIG. 11 is a diagram for describing an operation performed by an electronic device of the disclosure using an artificial intelligence (AI) technology according to an embodiment of the disclosure.

FIG. 11 is a diagram for describing an operation performed by the electronic device 1000 using an AI technology, according to an embodiment of the disclosure.

In detail, at least one of operations performed by the electronic device 1000 and including i) an operation of recognizing an input event, based on receiving a multi-touch input or a hover input of a user with respect to a touch screen, ii) an operation of identifying a function corresponding to the input event, based on shape information of a plurality of points and position information of the plurality of points at which the input event is recognized on the touch screen, iii) an operation of changing a function value with respect to the identified function, based on a gesture input being recognized via the touch screen, and iv) an operation of displaying a UI indicating the changed function value may be performed by using an AI technology that performs computation using a neural network.

An artificial intelligence technology (hereinafter, the 'AI technology') is for obtaining an intended result by performing processing, such as analysis and/or classification, on input data based on computations via a neural network.

The AI technology may be implemented by using algorithms. Here, an algorithm or a set of algorithms for implementing AI technology are called a neural network. Here, the neural network may receive an input of input data, may perform computations for analysis and classification, and may output resultant data. In order for the neural network to accurately output resulting data corresponding to input data, it is necessary to train the neural network. Here, 'training' may refer to training a neural network such that the neural network may find or learn on itself a method of analyzing various pieces of data input to the neural network, a method of classifying the input pieces of data, and/or a method of extracting, from the input pieces of data, features necessary for generating resulting data. In detail, through a training process, the neural network may be trained based on training data (e.g., a plurality of different images) so as to optimize weight values in the neural network. Then, the neural network having the optimized weight values may output an intended result by processing the input data.

Neural networks that include a plurality of hidden layers for performing computations, that is, the depth of which for performing computations is high, may be classified as deep neural networks. Examples of neural networks include convolutional neural networks (CNNs), recurrent neural networks (RNNs), restricted Boltzmann machines (RBMs), deep belief networks (DBNs), bidirectional recurrent DNNs (BRDNNs), and deep Q-networks, but the disclosure is not limited thereto. In addition, the neural networks may be subdivided. For example, CNNs may be subdivided into deep CNN (D-CNN), capsule neural networks (CapsNets) (not shown), and the like.

An 'AI model' may refer to a neural network including at least one layer operating to receive input data and output an intended result. Also, the 'AI model' may refer to an algorithm or a set of a plurality of algorithms for outputting an intended result by performing computations via a neural network, a processor for executing the algorithm (or the set of algorithms), software for executing the algorithm (or the set of algorithms), or hardware for executing the algorithm (or the set of algorithms).

At least one of the operations including i) the operation of recognizing an input event, based on receiving a multi-touch input or a hover input of a user with respect to a touch screen, ii) the operation of identifying a function corresponding to the input event, based on shape information of a plurality of points and position information of the plurality of points at which the input event is recognized on the touch screen, iii) the operation of changing a function value with respect to the identified function, based on a gesture input being recognized via the touch screen, and iv) the operation of displaying a UI indicating the changed function value may be performed based on the AI model.

Referring to FIG. 11, a neural network 10 may be trained by receiving an input of training data. Then, the trained neural network 10 may receive input data 11 via an input end 12, and the input end 12, a hidden layer 13, and an output end 14 may perform computations for analyzing the input data 11 and data transferred from a previous layer and outputting output data 15. Although FIG. 11 illustrates the hidden layer 13 as one layer, this is merely an example, and the hidden layer 13 may be formed of a plurality of layers.

In the disclosed embodiment, the neural network 10 may be trained to determine a type of an input event by analyzing shape information of a plurality of points, and identify a function set to corresponding to the type of the input event.

In the disclosed embodiment, the neural network 10 may be trained to identify a function corresponding to an input event, based on position information of an area in which the input event is recognized from among a plurality of areas into which a touch screen is divided.

In the disclosed embodiment, the neural network 10 may be trained to identify a function corresponding to an input event, based on position information of a touch screen on which the input event is recognized from among a plurality of touch screens.

In the disclosed embodiment, the neural network 10 may be trained to obtain operation state information including information about at least one of a function, an operation, or an application, which are being performed/executed by the electronic device 1000, and identify a function corresponding to an input event, based on shape information of a plurality of points, position information of the plurality of points, and the operation state information.

In the disclosed embodiment, the neural network 10 may be trained to identify a predetermined function corresponding to an input event, from among at least one function provided by an executed application.

In the disclosed embodiment, the neural network 10 may be trained to display a function information UI that graphically represents information about an identified function, in response to recognition of a multi-touch input or a hover input.

In the disclosed embodiment, the neural network 10 may be trained to display a UI, based on position information of a plurality of points at which an input event is recognized.

In the disclosed embodiment, the neural network 10 may be trained to display a UI on a preset display unit from among a plurality of display units, regardless of a touch screen on which an input event is recognized.

In the disclosed embodiment, data or program code related to the neural network 10 that performs at least one of the operations including i) the operation of recognizing an input event, based on receiving a multi-touch input or a hover input of a user with respect to a touch screen, ii) the operation of identifying a function corresponding to the input event, based on shape information of a plurality of points and position information of the plurality of points at which the input event is recognized on the touch screen, iii) the operation of changing a function value with respect to the identified function, based on a gesture input being recognized via the touch screen, and iv) the operation of displaying a UI indicating the changed function value may be stored in memory (see 1300 of FIG. 2), and learning using the neural network 10 may be performed by a processor (see 1200 of FIG. 2). In this case, the processor 1200 may include an AI processor.

Alternatively, the neural network 10 that performs at least one of the operations including i) the operation of recognizing an input event, based on receiving a multi-touch input or a hover input of a user with respect to a touch screen, ii) the operation of identifying a function corresponding to the input event, based on shape information of a plurality of points and position information of the plurality of points at which the input event is recognized on the touch screen, iii) the operation of changing a function value with respect to the identified function, based on a gesture input being recognized via the touch screen, and iv) the operation of displaying a UI indicating the changed function value may be implemented in a separate device (not shown) or a processor (not shown) which is different from the electronic device 1000.

Computations via the neural network 10 may be performed by a server (see 2000 of FIGS. 12 and 13) capable of communicating with the electronic device 1000 via a wireless communication network. Communication between the electronic device 1000 and the server 2000 will now be described with reference to FIGS. 12 and 13.

Figure 12:
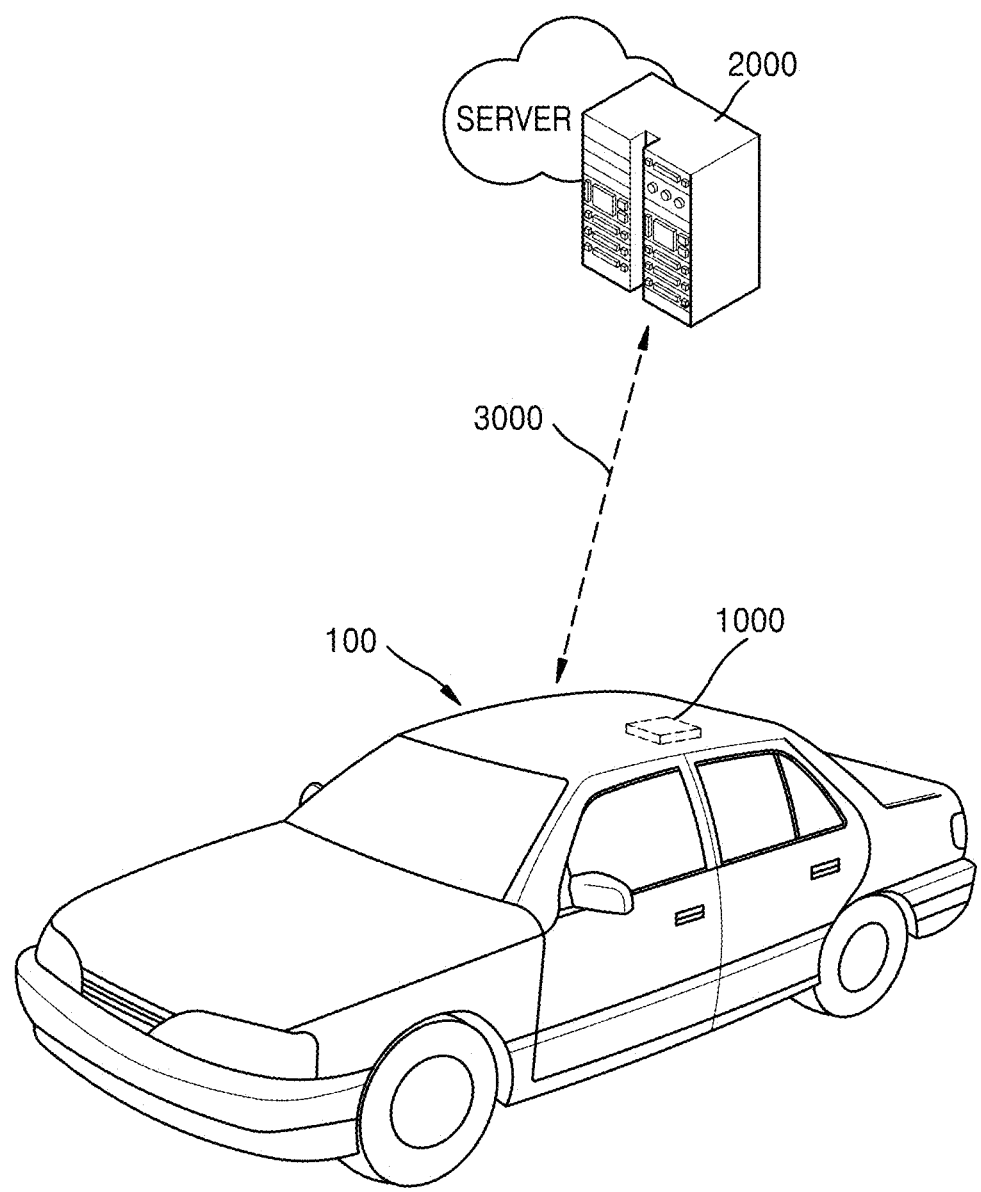
FIG. 12 is a diagram illustrating an embodiment in which an electronic device of the disclosure operates by interoperating with a server according to an embodiment of the disclosure.

FIG. 12 is a diagram illustrating the electronic device 1000 according to a disclosed embodiment which operates by interoperating with the server 2000 according to an embodiment of the disclosure.

The server 2000 may process data while transmitting and receiving data to and from the electronic device 1000 via a communication network 3000. The electronic device 1000 may be mounted in a vehicle 100.

Referring to FIG. 13, the server 2000 may include a communication interface 2100 configured to communicate with the electronic device 1000, a processor 2200 configured to execute at least one instruction, and a database 2300.

The server 2000 may train an AI model and may store a trained AI model. The server 2000 may perform, by using the trained AI model, at least one of the operations including i) the operation of recognizing an input event, based on receiving a multi-touch input or a hover input of a user with respect to a touch screen, ii) the operation of identifying a function corresponding to the input event, based on shape information of a plurality of points and position information of the plurality of points at which the input event is recognized on the touch screen, iii) the operation of changing a function value with respect to the identified function, based on a gesture input being recognized via the touch screen, and iv) the operation of displaying a UI indicating the changed function value.

In general, the electronic device 1000 may have a limit in memory storage capacity, a computation processing speed, a collection capacity with respect to a training data set, or the like, compared to the server 2000. Therefore, an operation requiring storage of a large amount of data and a large amount of computation may be performed by the server 2000, and requested data and/or AI model may be transmitted to the electronic device 1000 via a communication network. Then, the electronic device 1000 without a large amount memory and a processor having a fast computation capability may rapidly and easily a requested operation by receiving and using the requested data and/or AI model via the server 2000.

In the disclosed embodiment, the server 2000 may include the neural network 10 described with reference to FIG. 11.

FIG. 13 is a diagram for describing FIG. 12 in detail according to an embodiment of the disclosure.

Referring to FIG. 13, the server 2000 may include the communication interface 2100, the processor 2200, and the database 2300.

The communication interface 2100 performs communication with an external device via a wireless communication network. Here, the external device (not shown) may include a server capable of performing at least one of calculations requested by the electronic device 1000 or transmitting data or the like requested by the electronic device 1000.

The communication interface 2100 includes at least one communication module such as a short-range communication module, a wired communication module, a mobile communication module, a broadcasting receiving module, or the like. Here, the at least one communication module refers to a tuner that performs broadcast reception or a communication module capable of performing data transmission/reception through a network conforming to communication standards such as Bluetooth, wireless local area network (WLAN) (e.g., Wi-Fi), Wireless Broadband (WiBro), World Interoperability for Microwave Access (WiMAX), code-division multiple access (CDMA), wideband CDMA (WCDMA), the Internet, third generation (3G), fourth generation (4G), fifth generation (5G), and/or a communication scheme using millimeter waves (mmWave).

The mobile communication module included in the communication interface 2100 may perform communication with another device (e.g., the electronic device 1000) at a remote location via a communication network conforming to a communication standard, such as the Internet, 3G, 4G, and/or 5G. Here, a communication module that communicates with the other device may be referred to as a 'long-range communication module'. Unlike the electronic device 1000 shown in FIG. 2, the electronic device 1000 in an embodiment shown in FIG. 13 may further include a communication interface 1400. In an embodiment, the communication interface 2100 of the server 2000 may transmit or receive data to or from the communication interface 1400 of the electronic device 1000 by wire or wirelessly.

The processor 2200 controls all operations of the server 2000. For example, the processor 2200 may execute at least one of at least one instruction and programs to perform requested operations.

The database 2300 may include memory (not shown), and may store, in the memory (not shown), at least one of at least one instruction, a program, and data, which is requested for the server 2000 to perform a preset operation. Also, the database 2300 may store a plurality of pieces of data requested for the server 2000 to perform a calculation according to a neural network.

In an embodiment disclosed herein, the server 2000 may store the neural network 10 described with reference to FIG. 11 The neural network 10 may be stored in at least one of the processor 2200 and the database 2300. The neural network 10 included in the server 2000 may be a training-completed neural network.

Also, the server 2000 may transmit the training-completed neural network to the communication interface 1400 of the electronic device 1000 via the communication interface 2100. The electronic device 1000 may obtain and store the training-completed neural network, and may obtain desired output data via the neural network.

The disclosure provides the electronic device 1000 mounted in a vehicle. According to an embodiment of the disclosure, the electronic device 1000 may include the touch screen 1100, memory 1300 storing at least one instruction, at least one processor communicatively coupled to the touch screen 1100 and the memory 1300. The at least one instruction, when executed by the at least one processor 1200 individually or collectively, may cause the electronic device 1000 to recognize an input event, based on receiving a multi-touch input or a hover input, of a user with respect to the touch screen 1100. The at least one processor 1200 may be configured to identify a function corresponding to the input event, based on shape information of a plurality of points and position information of the plurality of points at which the input event is recognized on the touch screen 1100. The at least one processor 1200 may be configured to change a function value with respect to the identified function, based on a gesture input being recognized via the touch screen 1100. The at least one processor 1200 may be configured to display, on the touch screen 1100, a UI indicating the changed function value.

According to an embodiment of the disclosure, the shape information of the plurality of points may include a number of the plurality of points and a distance between each of the plurality of points, and the at least one instruction, when executed by the at least one processor 1200 individually or collectively, may further cause the electronic device 1000 to determine a type of the input event by analyzing the shape information of the plurality of points, and identify the function corresponding to the input event based on the function being set to correspond to the type of the input event.

According to an embodiment of the disclosure, the at least one instruction, when executed by the at least one processor 1200 individually or collectively, may further cause the electronic device 1000 to identify the function corresponding to the input event, based on position information of an area on which the input event is recognized from among a plurality of areas into which the touch screen 1100 is divided.

According to an embodiment of the disclosure, the touch screen 1100 may include a plurality of touch screens, and the at least one instruction, when executed by the at least one processor 1200 individually or collectively, may further cause the electronic device 1000 to identify the function corresponding to the input event, based on position information of one of the plurality of touch screens 1100 on which the input event is recognized.

According to an embodiment of the disclosure, the at least one instruction, when executed by the at least one processor 1200 individually or collectively, may further cause the electronic device 1000 to obtain operation state information including information about at least one of a performed function, a performed operation, or an executed application, and identify the function corresponding to the input event, based on the shape information of the plurality of points, the position information of the plurality of points, and the operation state information.

According to an embodiment of the disclosure, the at least one instruction, when executed by the at least one processor 1200 individually or collectively, may further cause the electronic device 1000 to identify a predetermined function corresponding to the input event, from among at least one function provided by the executed application.

According to an embodiment of the disclosure, the at least one instruction, when executed by the at least one processor 1200 individually or collectively, may further cause the electronic device 1000 to display, on the touch screen 1100, a function information UI that graphically represents information about the identified function, based on the multi-touch input or the hover input being recognized via the touch screen.

According to an embodiment of the disclosure, the at least one instruction, when executed by the at least one processor 1200 individually or collectively, may further cause the electronic device 1000 to display, on the touch screen 1100, a UI based on the position information of the plurality of points.

According to an embodiment of the disclosure, the electronic device 1000 may further include a plurality of the touch screens 1100, and the at least one instruction, when executed by the at least one processor 1200 individually or collectively, may further cause the electronic device 1000 to display a UI on a preset touch screen from among the plurality of touch screens 110, regardless of which of the plurality of touch screens 1100 the input event is recognized on.

According to an embodiment of the disclosure, a function may be mapped to at least one of a position of the touch screen 1100 on which an input event is recognized, a plurality of areas of the touch screen 1100, or a shape of the input event.

The disclosure provides a method performed by the electronic device 1000 mounted in a vehicle. According to an embodiment of the disclosure, a method of the electronic device 1000 may include recognizing an input event, based on receiving a multi-touch input or a hover input, of a user with respect to the touch screen 1100. The method of the electronic device 1000 may include identifying a function corresponding to the input event, based on shape information of a plurality of points and position information, of the plurality of points at which the input event is recognized on the touch screen 1100. The method of the electronic device 1000 may include changing a function value with respect to the identified function, based on a gesture input being recognized via the touch screen 1100. The method of the electronic device 1000 may include displaying a UI indicating the changed function value.

According to an embodiment of the disclosure, the shape information of the plurality of points may include a number of the plurality of points and a distance between each of the plurality of points, and the identifying of the function corresponding to the input event may include determining a type of the input event by analyzing the shape information of the plurality of points, and identifying the function corresponding to the input event based on the function being set to correspond to the type of the input event.

According to an embodiment of the disclosure, in the identifying of the function corresponding to the input event, the electronic device 1000 may identify the function corresponding to the input event, based on position information of an area on which the input event is recognized from among a plurality of areas into which the touch screen is divided.

According to an embodiment of the disclosure, the touch screen 1100 may include a plurality of touch screens, and the identifying of the function corresponding to the input event may include identifying the function corresponding to the input event, based on position information of one of the plurality of touch screens 1100 on which the input event is recognized.

According to an embodiment of the disclosure, the method may further include obtaining operation state information including information about at least one of a function, an operation, or an application, which are being performed/executed by the electronic device 1000. In the identifying of the function corresponding to the input event, the electronic device 1000 may identify the function corresponding to the input event, based on the shape information of the plurality of points, the position information of the plurality of points, and the operation state information.

According to an embodiment of the disclosure, the identifying of the function corresponding to the input event may include identifying a predetermined function corresponding to the input event, from among at least one function provided by the executed application.

According to an embodiment of the disclosure, the method may further include displaying a function information UI that graphically represents information about the identified function, based on the multi-touch input or the hover input being recognized.

According to an embodiment of the disclosure, in the displaying of the UI, the electronic device 1000 may display the UI, based on the position information of the plurality of points.

According to an embodiment of the disclosure, the electronic device 1000 may further include a plurality of the touch screens 1100, and in the displaying of the UI, the electronic device 1000 may display the UI on a preset touch screen from among the plurality of touch screens 1100, regardless of which of the plurality of touch screens 1100 the input event is recognized on.

In order to resolve the technical problems addressed above, another aspect of the disclosure provides one or more non-transitory computer-readable storage media storing at least one instruction that, when executed by at least one processor of an electronic device individually or collectively, causes the electronic device 1000 to perform operations including: recognizing an input event, based on receiving a multi-touch input or a hover input, of a user with respect to the touch screen 1100; identifying a function corresponding to the input event, based on shape information of a plurality of points and position information, of the plurality of points at which the input event is recognized on the touch screen 1100; changing a function value with respect to the identified function, based on a gesture input being recognized via the touch screen 1100; and displaying a UI indicating the changed function value.

A program executable by the electronic device 1000 described in the specification may be implemented as a hardware element, a software element, and/or a combination of hardware elements and software elements. The program is executable by any system capable of executing computer-readable instructions.

The software may include a computer program, code, instructions, or a combination of one or more thereof, and may configure the processor to operate as desired or may independently or collectively instruct the processor.

The software may be implemented as a computer program that includes instructions stored in computer-readable storage media. The computer-readable storage media may include, for example, magnetic storage media (e.g., a read-only memory (ROM), a random-access memory (RAM), floppy disks, hard disks, etc.) and optical storage media (e.g., a compact disc ROM (CD-ROM), a digital versatile disc (DVD), etc.). The computer-readable recording medium may be distributed in computer systems connected via a network and may store and execute computer-readable code in a distributed manner. The medium is readable by a computer, stored in memory, and executable by a processor.

The computer-readable storage medium may be provided in the form of a non-transitory storage medium. Here, the term 'non-transitory' simply means that the storage medium is a tangible device, and does not include a signal, but this term does not differentiate between where data is semi-permanently stored in the storage medium and where the data is temporarily stored in the storage medium. For example, the non-transitory storage medium may include a buffer in which data is temporarily stored.

In addition, a program according to embodiments disclosed in the specification may be provided in a computer program product. The computer program product may be traded as commodities between sellers and buyers.

The computer program product may include a software program and a computer-readable recording medium storing the software program. For example, the computer program product may include a product (e.g., a downloadable application) in the form of a software program electronically distributed via a manufacturer of the electronic device or an electronic market (e.g., Samsung Galaxy Store™, Google PlayStore™). For electronic distribution, at least part of the software program may be stored in a storage medium or temporarily generated. In this case, the storage medium may be a storage medium of a server of the manufacturer of the electronic device 1000, a server of the electronic market, or a relay server that temporarily stores the software program.

The computer program product may include a storage medium of the server 2000 or a storage medium of another electronic device, in a system consisting of the electronic device 1000, the server 2000 (see FIGS. 12 and 13), and the other electronic device. Alternatively, when there is a third device (e.g., a smart phone) communicatively connected to the electronic device 1000, the computer program product may include a storage medium of the third device. Alternatively, the computer program product may include the software program itself, which is transmitted from the electronic device 1000 to the electronic device or the third device or transmitted from the third device to the electronic device.

In this case, one of the electronic device 1000, the electronic device, and the third device may execute the computer program product to perform the method according to the embodiments disclosed herein. Alternatively, at least two of the electronic device 1000, the electronic device, and the third device may execute the computer program product to execute the method according to the embodiments disclosed herein in a distributed manner.

For example, the electronic device 1000 may execute the computer program product stored in the memory (see 1300 of FIG. 2) to control another electronic device communicatively connected to the electronic device 1000 to perform the method according to embodiments disclosed herein.

As another example, the third device may execute the computer program product to control an electronic device communicatively connected to the third device to perform the method according to an embodiment disclosed herein.

When the third device executes the computer program product, the third device may download the computer program product from the electronic device 1000, and may execute the downloaded computer program product. Alternatively, the third device may execute the computer program product provided in a pre-loaded state to perform the method according to the embodiments disclosed herein.

While the disclosure has been shown and described with reference to various embodiments thereof, it will be understood by those of skilled in the art that various changes in form and details may be made therein without departing from the spirit and scope of the disclosure as defined by the appended claims and their equivalents.

What is claimed is:

1. An electronic device mounted in a vehicle, the electronic device comprising:
    a touch screen;
    memory storing at least one instruction; and
    at least one processor communicatively coupled to the touch screen and the memory,
    wherein the at least one instruction, when executed by the at least one processor individually or collectively, causes the electronic device to:
        recognize an input event, based on receiving a multi-touch input or a hover input, of a user with respect to the touch screen,
        identify a function corresponding to the input event, based on shape information and position information of a plurality of points at which the input event is recognized on the touch screen,
        display, on the touch screen, a function information user interface (UI) including a first function value indicating a numerical value with respect to the identified function,
        change the first function value to a second function value, based on a gesture input retaining the shape information of the plurality of points at which the input event being recognized via the touch screen, and
        display, on the touch screen, the function information UI including the second function value.

2. The electronic device of claim 1,
    wherein the shape information of the plurality of points comprises a number of the plurality of points and a distance between each of the plurality of points, and
    wherein the at least one instruction, when executed by the at least one processor individually or collectively, further causes the electronic device to:
        determine a type of the input event by analyzing the shape information of the plurality of points, and
        identify the function corresponding to the input event based on the function being set to correspond to the type of the input event.

3. The electronic device of claim 1, wherein the at least one instruction, when executed by the at least one processor individually or collectively, further causes the electronic device to:
    identify the function corresponding to the input event, based on position information of an area on which the input event is recognized from among a plurality of areas into which the touch screen is divided.

4. The electronic device of claim 1,
    wherein the touch screen comprises a plurality of touch screens, and
    wherein the at least one instruction, when executed by the at least one processor individually or collectively, further causes the electronic device to:
        identify the function corresponding to the input event, based on position information of one of the plurality of touch screens on which the input event is recognized.

5. The electronic device of claim 1, wherein the at least one instruction, when executed by the at least one processor individually or collectively, further causes the electronic device to:
    obtain operation state information comprising information about at least one of a performed function, a performed operation, or an executed application, and
    identify the function corresponding to the input event, based on the shape information of the plurality of points, the position information of the plurality of points, and the operation state information.

6. The electronic device of claim 5, wherein the at least one instruction, when executed by the at least one processor individually or collectively, further causes the electronic device to:
    identify a predetermined function corresponding to the input event, from among at least one function provided by the executed application.

7. The electronic device of claim 1, wherein the at least one instruction, when executed by the at least one processor individually or collectively, further causes the electronic device to:
    display, on the touch screen, the function information UI based on the position information of the plurality of points.

8. The electronic device of claim 1,
    wherein the touch screen comprises a plurality of touch screens, and
    wherein the at least one instruction, when executed by the at least one processor individually or collectively, further causes the electronic device to:
        display the function information UI on a preset touch screen from among the plurality of touch screens, regardless of which of the plurality of touch screens the input event is recognized on.

9. The electronic device of claim 1, wherein the function is mapped to at least one of a position of the touch screen on which the input event is recognized, a plurality of areas of the touch screen, or a shape of the input event.

10. A method performed by an electronic device mounted in a vehicle, the method comprising:
    recognizing an input event, based on receiving multi-touch input or a hover input, of a user with respect to a touch screen;
    identifying a function corresponding to the input event, based on shape information of a plurality of points and position information of the plurality of points at which the input event is recognized on the touch screen;

displaying a function information user interface (UI) including a first function value indicating a numerical value with respect to the identified function;

changing the first function value to a second function value, based on a gesture input retaining the shape information of the plurality of points at which the input event being recognized via the touch screen; and displaying the function information UI including the second function value.

11. The method of claim 10,
wherein the shape information of the plurality of points comprises a number of the plurality of points and a distance between each of the plurality of points, and
wherein the identifying of the function corresponding to the input event comprises:
determining a type of the input event by analyzing the shape information of the plurality of points; and
identifying the function corresponding to the input event based on the function being set to correspond to the type of the input event.

12. The method of claim 10, wherein the identifying of the function corresponding to the input event comprises identifying the function corresponding to the input event, based on position information of an area on which the input event is recognized from among a plurality of areas into which the touch screen is divided.

13. The method of claim 10,
wherein the touch screen comprises a plurality of touch screens, and
wherein the identifying of the function corresponding to the input event comprises identifying the function corresponding to the input event, based on position information of one of the plurality of touch screens on which the input event is recognized.

14. The method of claim 10, further comprising:
obtaining operation state information comprising information about at least one of a function performed by the electronic device, an operation performed by the electronic device, or an application executed by the electronic device,
wherein the identifying of the function corresponding to the input event comprises identifying the function corresponding to the input event, based on the shape information of the plurality of points, the position information of the plurality of points, and the operation state information.

15. The method of claim 14, wherein the identifying of the function corresponding to the input event comprises identifying a predetermined function corresponding to the input event, from among at least one function provided by the executed application.

16. The method of claim 10, wherein the displaying of the function information UI comprises displaying the UI based on the position information of the plurality of points.

17. The method of claim 10,
wherein the touch screen comprises a plurality of touch screens, and
wherein the displaying of the function information UI comprises displaying the function information UI on a preset touch screen from among the plurality of touch screens, regardless of which of the plurality of touch screens the input event is recognized on.

18. One or more non-transitory computer-readable storage media storing at least one instruction that, when executed by at least one processor of an electronic device individually or collectively, causes the electronic device to perform operations, the operations comprising:
recognizing an input event, based on receiving a multi-touch input or a hover input, of a user with respect to a touch screen;
identifying a function corresponding to the input event, based on shape information of a plurality of points and position information of the plurality of points at which the input event is recognized on the touch screen;
displaying a function information user interface (UI) including a first function value indicating a numerical value with respect to the identified function;
changing the first function value to a second function value, based on a gesture input retaining the shape information of the plurality of points at which the input event is being recognized via the touch screen; and
displaying the function information UI including the second function value.

* * * * *